US012746990B2

(12) United States Patent
Thorén et al.

(10) Patent No.: US 12,746,990 B2
(45) Date of Patent: Sep. 29, 2026

(54) TRACK ASSEMBLY FOR A TRACKED VEHICLE

(71) Applicant: BAE Systems Hägglunds Aktiebolag, Örnsköldsvik (SE)

(72) Inventors: Max Thorén, Örnsköldsvik (SE); Björn Hellholm, Arnäsvall (SE); Filip Byberg, Linköping (SE)

(73) Assignee: BAE Systems Hägglunds Aktiebolag, Örnsköldsvik (SE)

(*) Notice: Subject to any disclaimer, the term of this patent is extended or adjusted under 35 U.S.C. 154(b) by 345 days.

(21) Appl. No.: 18/283,591

(22) PCT Filed: Mar. 24, 2022

(86) PCT No.: PCT/SE2022/050285
§ 371 (c)(1),
(2) Date: Sep. 22, 2023

(87) PCT Pub. No.: WO2022/203585
PCT Pub. Date: Sep. 29, 2022

(65) Prior Publication Data

US 2024/0166276 A1 May 23, 2024

(30) Foreign Application Priority Data

Mar. 25, 2021 (SE) .................................... 2150357-8

(51) Int. Cl.
*B62D 55/125* (2006.01)
*B60T 1/06* (2006.01)
*B62D 55/112* (2006.01)

(52) U.S. Cl.
CPC ............ *B62D 55/125* (2013.01); *B60T 1/062* (2013.01); *B62D 55/112* (2013.01)

(58) Field of Classification Search
CPC ...... B62D 55/125; B62D 55/112; B60T 1/062
See application file for complete search history.

(56) References Cited

U.S. PATENT DOCUMENTS 3,704,757 A 12/1972 Buress
3,872,939 A 3/1975 Eckert
(Continued)

FOREIGN PATENT DOCUMENTS

CN 110546025 A 12/2019
DE 1962118 A1 6/1971
(Continued)

OTHER PUBLICATIONS

WO2018222105A1 (Year: 2018).*
(Continued)

*Primary Examiner* — Christopher B Wehrly
(74) *Attorney, Agent, or Firm* — Morrison & Foerster LLP

(57) ABSTRACT

The invention relates to a track assembly for a tracked vehicle. Said track assembly comprises a track support beam configured to support road wheels, a drive wheel member, and a drive arrangement for drive wheel member operation and an endless track disposed around said road wheels and drive wheel member. Said drive arrangement comprises a brake arrangement for braking the drive wheel member, and a drive axle coaxially arranged relative to a centre axis of said drive wheel member for rotating said drive wheel member. Said brake arrangement is configured to be journaled in bearings in connection to a portion of the drive axle. Said brake arrangement comprises a torque arm configured to be connected to said track support beam so as to essentially prevent rotation of a brake housing of said brake arrangement about said centre axis.

17 Claims, 10 Drawing Sheets

(56) References Cited

U.S. PATENT DOCUMENTS

| | | | |
|---|---|---|---|
| 3,994,352 | A | 11/1976 | Siorek |
| 4,201,279 | A | 5/1980 | Fukui |
| 6,907,946 | B1 | 6/2005 | Buckley |
| 8,267,212 | B1 | 9/2012 | Mercier |
| 2008/0173492 | A1 | 7/2008 | Aitcin |
| 2014/0305719 | A1 | 10/2014 | Graner et al. |
| 2015/0101872 | A1 | 4/2015 | Girouard |
| 2020/0070644 | A1 | 3/2020 | Tigue |

FOREIGN PATENT DOCUMENTS

| | | | |
|---|---|---|---|
| DE | 102019203385 | A1 | 9/2020 |
| JP | S61135873 | A | 6/1986 |
| WO | 2018/222105 | A1 | 12/2018 |

OTHER PUBLICATIONS

International Search Report and Written Opinion mailed May 12, 2022, directed to International Application No. PCT/SE2022/050285; 11 pages.

Office Action dated Nov. 29, 2021 directed to SE Application No. 2150357-8; 8 pages.

Extended European Search Report dated Jan. 24, 2025, directed to EP Application No. 22776234.1; 9 pages.

First Office Action and Search Report dated Apr. 15, 2026, directed to CN Application No. 202280023494.8; 17 pages.

* cited by examiner

TRACK ASSEMBLY FOR A TRACKED VEHICLE

CROSS-REFERENCE TO RELATED APPLICATIONS

This application is a U.S. national stage application under 35 U.S.C. § 371 of International Application No. PCT/SE2022/050285 filed Mar. 24, 2022, which claims the priority of SE Application No. 2150357-8 filed Mar. 25, 2021, the entire contents of each priority application is incorporated herein by reference.

FIELD OF THE DISCLOSURE

The present invention relates to a track assembly for a tracked vehicle. The present invention relates to a tracked vehicle comprising at least one such track assembly.

BACKGROUND OF THE DISCLOSURE

Tracked vehicles may comprise a pair of track assemblies, where each track assembly of the pair of track assemblies comprises a track support beam, a drive wheel member, a plurality of road wheels and an endless track running over the drive wheel member and said plurality of road wheels. Said drive wheel member and said plurality of road wheels are rotatably secured to said track support beam. A drive unit of a drive arrangement of said tracked vehicle may be configured to drive a drive axle which in turn is configured to rotate said drive wheel member which is arranged to drive said endless track so as to propel the tracked vehicle. In order to provide a braking function for stopping drive of such a tracked vehicle, a brake arrangement may be arranged in connection to said drive axle and drive wheel member.

There is however a need to present improvements for track assemblies for tracked vehicles.

OBJECTS OF THE INVENTION

An object of the present invention is to provide a track assembly for a tracked vehicle, where said track assembly comprises a drive arrangement with drive unit and brake arrangement, which facilitates a radially compact drive arrangement, with efficient brake function of said brake arrangement.

Another object of the present invention is to provide a tracked vehicle with at least one such track assembly.

SUMMARY OF THE DISCLOSURE

These and other objects, apparent from the following description, are achieved by a track assembly for a tracked vehicle, and a tracked vehicle as set out in the appended independent claims. Preferred embodiments of the track assembly are defined in appended dependent claims.

Specifically an object of the invention is achieved by a track assembly for a tracked vehicle. Said track assembly is configured to be connected to a vehicle body of said vehicle. Said track assembly comprises a track support beam configured to support a plurality of road wheels, a drive wheel member, and a drive arrangement for operating said drive wheel member, said drive wheel member being configured to be rotated about a centre axis. An endless track is disposed around said road wheels and drive wheel member. Said drive arrangement comprises a drive unit for driving said drive wheel member, and a brake arrangement for braking the drive wheel member. Said drive arrangement comprises a drive axle being configured to be coaxially arranged relative to said centre axis of said drive wheel member for rotating said drive wheel member. The brake arrangement comprises a housing configured to provide an enclosure for brake members of said brake arrangement. Said brake arrangement is configured to be journaled in bearings in connection to a portion of the drive axle protruding from said drive wheel member so as to allow rotation of said drive axle relative to said brake housing. Said brake arrangement comprises a torque arm configured to be connected to said track support beam so as to essentially prevent rotation of said brake housing of said brake arrangement about said centre axis. Said torque arm is configured to be attached to or constitute a portion of said brake housing.

Hereby a radially compact drive arrangement may be provided, which facilitates efficient function of said brake arrangement in connection to braking function associated with drive and/or parking.

Said brake arrangement may comprise any suitable brake unit for braking the drive wheel member. Said brake arrangement may comprise any suitable brake unit for providing a brake action at said drive axle for braking the drive wheel member. According to an aspect of the present disclosure, said brake arrangement comprises a set of friction elements configured to be arranged about said drive axle, said set of friction elements being configured to be pressed together in the axial direction for providing a braking function in connection to said drive axle.

According to an embodiment of said track assembly, said drive axle is configured to be journaled in bearings in said track support beam so as to allow rotation of said drive wheel member relative to said track support beam, wherein said drive axle is configured to run through said track support beam, protruding from an outer side of said track support beam configured to face away from the vehicle body when the track assembly is connected to said vehicle body, wherein said brake arrangement is configured to be journaled in bearings in connection to a portion of the drive axle protruding from the outer side of said track support beam in connection to said drive wheel member. By thus arranging said drive axle so that it is journaled in bearings in said track support beam, the drive arrangement may be efficiently supported, e.g. by means of a bearing configuration, in said track support beam. Hereby said drive axle of said drive arrangement essentially coaxially coincides with the centre axis of the drive wheel member, whereby efficient and radially compact drive unit may be provided by means of said track assembly, facilitating high operational reliability and efficiency when utilized in a tracked vehicle. Such a solution may easily and efficiently be applied to existing track assemblies, and be used for existing drive wheel members. Hereby a drive arrangement where easy access to essential parts such as brake arrangement and associated parts is facilitated. Hereby a drive arrangement facilitating easy assembly and disassembly may be provided.

According to an embodiment of said track assembly, said torque arm is configured to provide transport through said torque arm to parts of the brake arrangement in need of fluid and/or from one or more spaces within the brake arrangement. By thus utilizing said torque arm for providing transport of fluid for said brake arrangement, efficient control of such transport may be provided.

According to an embodiment of said track assembly, said torque arm comprises a set of channels integrated in said torque arm for transportation of fluid, wherein said set of channels comprises one or more inflow channels for fluid to be supplied to parts of the brake arrangement in need of fluid, and/or one or more outflow channels for outflow of fluid from one or more spaces within the brake arrangement. By thus providing such channels within said torque arm for providing transport of fluid for said brake arrangement, efficient control of such transport may be provided.

According to an embodiment of said track assembly, said one or more inflow channels for fluid to be supplied to parts of the brake arrangement in need of fluid comprises one or more channels for providing pressurized fluid for parts associated with brake operation of the brake arrangement and/or one or more channels for cooling and/or lubrication of parts in need of cooling and/or lubrication.

According to an embodiment of said track assembly, said torque arm comprises a set of conduit connections for connecting conduits to said set of channels for said transportation of fluid. Hereby easy and efficient connection of conduits, and disconnection of conduits, may be obtained, thus facilitating assembly and disassembly of said brake arrangement, and facilitating operation of said brake arrangement.

According to an embodiment of said track assembly, said conduit connections of said torque arm are configured to face towards said track support beam. Hereby a solution is provided where said conduits are efficiently protected.

According to an embodiment of said track assembly, a fluid system is provided, said fluid system being arranged for transporting fluid via said torque arm. By thus providing such a fluid system, efficient control of operation of said brake arrangement may be provided.

According to an embodiment of said track assembly, said fluid system comprises a pump arrangement comprising one or more pump units arranged for transporting fluid, via said torque arm, to parts of the brake arrangement in need of fluid and/or from one or more spaces within the brake arrangement. By thus providing such a fluid system with a pump unit, efficient transportation of fluid may be obtained and thus efficient control of operation of said brake arrangement may be provided.

According to an embodiment of said track assembly, said fluid system further comprises a fluid reservoir for storage of fluid, wherein said pump unit is arranged to transport fluid from said fluid reservoir, via said torque arm, to parts of the brake arrangement in need of fluid via and/or transport fluid from one or more spaces within the brake arrangement, via said torque arm, to said fluid reservoir. By thus providing such a fluid system with a pump arrangement and reservoir, efficient transportation and storage of fluid may be obtained and thus efficient control of operation of said brake arrangement may be provided.

According to an embodiment of said track assembly, said fluid system comprises or is configured to be operably connected to a hydraulic system during operation of said tracked vehicle, when the track assembly is connected to the vehicle body of the tracked vehicle, wherein said hydraulic system is configured to provide pressurized fluid for parts associated with brake operation of the brake arrangement. Hereby efficient control of operation of said brake arrangement may be provided.

According to an embodiment of said track assembly, said torque arm is configured to provide torque resistance in connection to a brake action of said brake arrangement on said drive axle. Hereby a radially compact brake arrangement may be provided, which facilitates efficient function of said brake arrangement in connection to braking function associated with drive and/or parking.

According to an embodiment of said track assembly, said torque arm is configured to be movably connected to said track support beam such that the movement of the torque arm and hence brake arrangement relative to said track support beam is a movement in the longitudinal direction of said endless track. According to an embodiment of said track assembly, said movement of the brake arrangement in the longitudinal direction is a controlled movement. Hereby connection of said brake arrangement, i.e. torque arm of brake arrangement, to said track support beam may be efficiently obtained via a suspension arrangement by thus providing said movement of the brake arrangement in the longitudinal direction.

According to an embodiment of said track assembly, said movable connection of said torque arm to said track support beam is arranged to be provided by means of a pin member fixedly arranged in connection to one of said track support beam and torque arm and an oval recess arranged in connection to the other of said of said track support beam and torque arm, wherein said pin member is connected to said oval recess such that said movement of the torque arm and hence brake arrangement relative to said track support beam in the longitudinal direction of said endless track is facilitated. Hereby said movement of the brake arrangement in the longitudinal direction may be efficiently and controllably obtained. According to an embodiment of said track assembly, said oval recess is configured to facilitate controlled movement of the torque arm relative to said track support beam in the longitudinal direction of said track support beam. According to an embodiment of said track assembly, said oval recess is configured to facilitate guided movement of the pin member and hence torque arm relative to said track support beam in the longitudinal direction of said track support beam. According to an embodiment of said track assembly, said pin member is configured to be fixedly attached in one end to said one of said track support beam and torque arm and connected to said oval recess in the opposite end such that movement of the torque arm and hence brake arrangement relative to said track support beam in the longitudinal direction of said endless track is facilitated and movement in the vertical direction is impeded, i.e. essentially prevented.

According to an embodiment of said track assembly, said brake arrangement comprises a housing configured to provide an enclosure for brake members of said brake arrangement, said torque arm being attached to or constitutes a portion of said housing. Hereby efficient enclosing of brake members and efficient journaling of said brake arrangement may be obtained.

According to an embodiment of said track assembly, said drive arrangement is configured to be coaxially arranged relative to said centre axis of said drive wheel member. Hereby a radially compact solution may be provided.

Specifically an object of the invention is achieved by a tracked vehicle comprising at least one track assembly as set out herein.

According to an embodiment, said tracked vehicle comprises a left track assembly, a right track assembly and a vehicle body, wherein said track assemblies are suspendedly arranged to said vehicle body by means of a suspension arrangement.

The tracked vehicle may comprise one or more tracked vehicle units. The tracked vehicle comprises according to an embodiment more than one tracked vehicle unit, said vehicle units being articulately connected to each other.

According to an embodiment, said tracked vehicle is an articulated tracked vehicle comprising a first vehicle unit and a second vehicle unit pivotably connected to the first vehicle unit via an articulation joint, each of said vehicle units comprising a vehicle body and track assembly pair suspendedly connected to respective vehicle body.

BRIEF DESCRIPTION OF THE FIGURES

A better understanding of the present invention will be had upon the reference to the following detailed description when read in conjunction with the accompanying drawings, wherein like reference characters refer to like parts throughout the several views, and in which.

DETAILED DESCRIPTION OF THE DISCLOSURE

Hereinafter the term "track support beam" refers to a structural element arranged to support ground-engaging means such as e.g. an endless track as well as drive wheel member and road wheels.

Hereinafter the term "track assembly" refers to a unit of the tracked vehicle comprising track support beam, drive wheel member and road wheels as well as a circumferential endless track, which unit is arranged to comprise ground-engaging means and configured to propel the vehicle and thus form at least part of a drive configuration of the tracked vehicle.

Hereinafter the term "track assembly pair" refers to opposite track assemblies of a vehicle unit of the vehicle, one track assembly constituting a right track assembly and the opposite track assembly constituting a left track assembly.

Hereinafter the term "articulated vehicle" refers to a vehicle with at least a front and a rear vehicle unit, which vehicle units are pivotable relative to each other about at least one joint.

Hereinafter the term "vehicle body" refers to any structure of a vehicle configured to be supported by track assemblies of a tracked vehicle and may comprise or constitute the vehicle chassis. The term "vehicle body" may refer to a vehicle frame, one or more beams or the like. The term "vehicle body" may refer to chassis of the vehicle and bodywork.

Hereinafter the term "centre axis", when referring to said drive wheel member being configured to be rotated about a centre axis, refers to the axis about which a drive wheel member of a track assembly is configured to rotate, and hence to an axis running in the transversal direction and perpendicular to the longitudinal direction of the endless track of said track assembly.

Figure 1A:
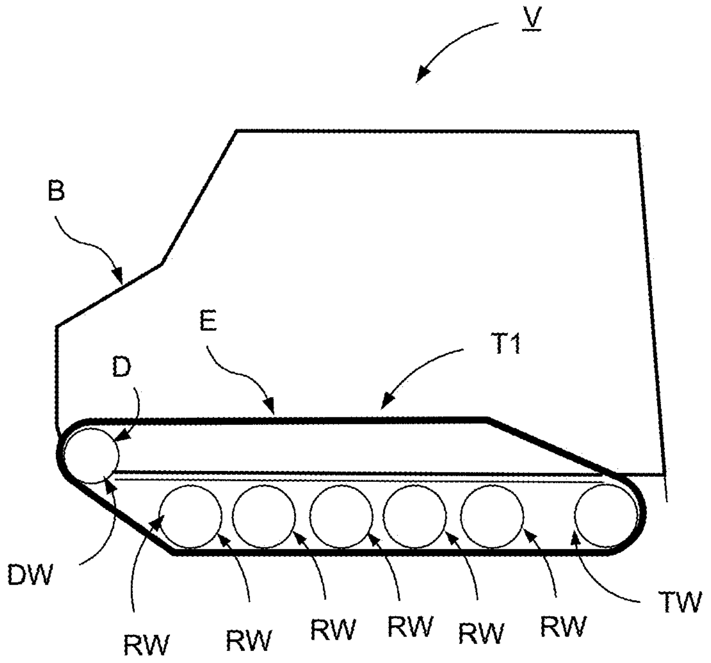
FIG. 1A schematically illustrates a side view of a tracked vehicle comprising track assembly according to an embodiment of the present disclosure.

FIG. 1A schematically illustrates a side view of a tracked vehicle V according to an embodiment of the present disclosure.

The tracked vehicle V comprises a vehicle body B, which according to an aspect of the present disclosure comprises the chassis of the vehicle V and bodywork.

The tracked vehicle V comprises a left track assembly T1 and a right track assembly for driving the vehicle V, the left track assembly T1 being shown in FIG. 1A. Each track assembly comprises a drive wheel member DW, a tension wheel TW, a set of road wheels RW and an endless track E arranged to run over said wheels. The endless track E is thus arranged to be disposed around said wheels. Here the drive wheel member DW is arranged in the front, the tension wheel TW is arranged in the back and the road wheels RW are arranged between the drive wheel member DW and the tension wheel TW. The tracked vehicle according to the present disclosure may however have track assemblies with any suitable arrangement of drive wheel member, tension wheel and road wheels. According to an aspect of the present disclosure the tension wheel may be arranged in the front, the drive wheel member arranged in the back and the road wheels arranged there between.

The endless track E of the respective track assembly is arranged to be driven and hence rotated by means of said drive wheel member DW. The respective track assembly T1 of the tracked vehicle V comprises a drive arrangement D for operating and hence driving said drive wheel member DW. The drive arrangement D is configured to be coaxially arranged relative to the drive wheel member DW.

Figure 1B:
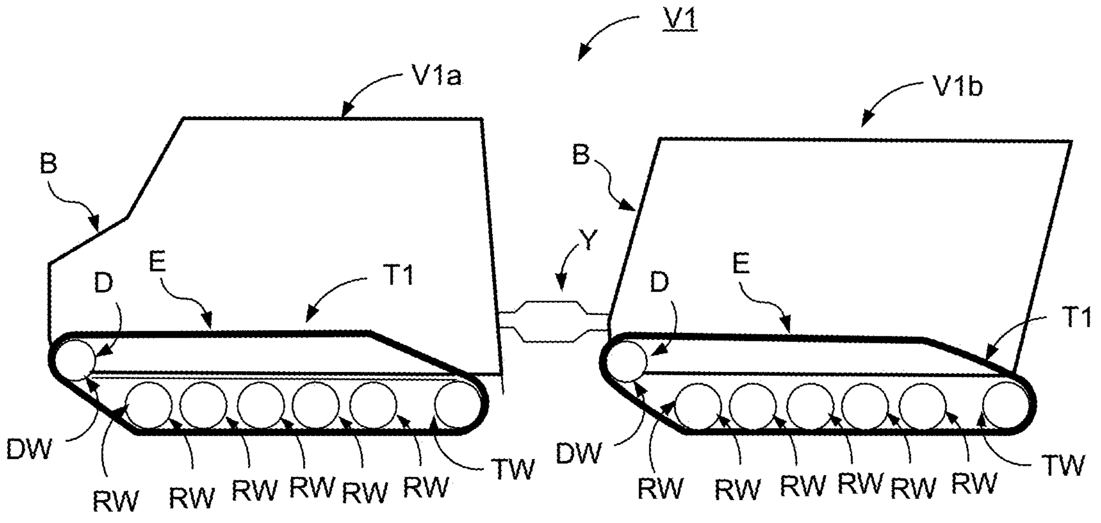
FIG. 1B schematically illustrates a side view of an articulated tracked vehicle comprising track assemblies according to an embodiment of the present disclosure.

FIG. 1B schematically illustrates a side view of a tracked vehicle V1 according to an embodiment of the present disclosure.

Said tracked vehicle V1 is an articulated tracked vehicle V1 comprising a first vehicle unit V1*a* and a second vehicle unit V1*b* pivotably connected to the first vehicle unit V1*a* via an articulation joint Y. Each of said vehicle units V1*a*, V1*b* comprises a vehicle body B and track assembly pair T1 suspendedly connected to respective vehicle body B, the left track assembly T1 of the respective vehicle unit V1*a*, V1*b* being shown.

Each track assembly comprises a drive wheel member DW, a tension wheel TW, a set of road wheels RW and an endless track E arranged to run over said wheels. The endless track E is thus arranged to be disposed around said wheels. Here the drive wheel member DW is arranged in the front, the tension wheel TW is arranged in the back and the road wheels RW are arranged between the drive wheel member DW and the tension wheel TW.

The endless track E of the respective track assembly of the respective vehicle unit V1*a*, V1*b* of said tracked vehicle V1 is arranged to be driven and hence rotated by means of said drive wheel member DW. The respective track assembly T1 of the vehicle units V1*a*, V1*b* of said tracked vehicle V1 may comprise a drive arrangement D for operating and hence driving said drive wheel member DW. The drive arrangement D is configured to be coaxially arranged relative to the drive wheel member DW.

Figure 2:
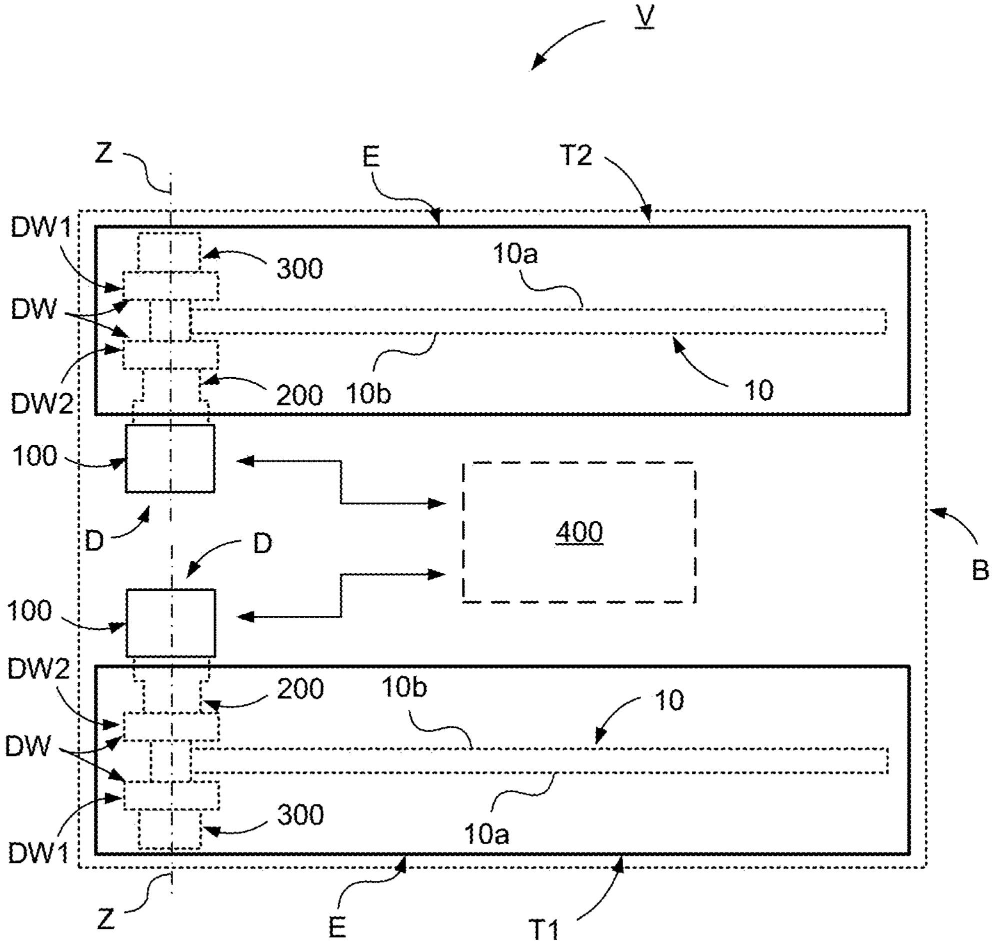
FIG. 2 schematically illustrates a plan view of a tracked vehicle with track assemblies comprising a drive arrangement according to an embodiment of the present disclosure.
Figure 3A:
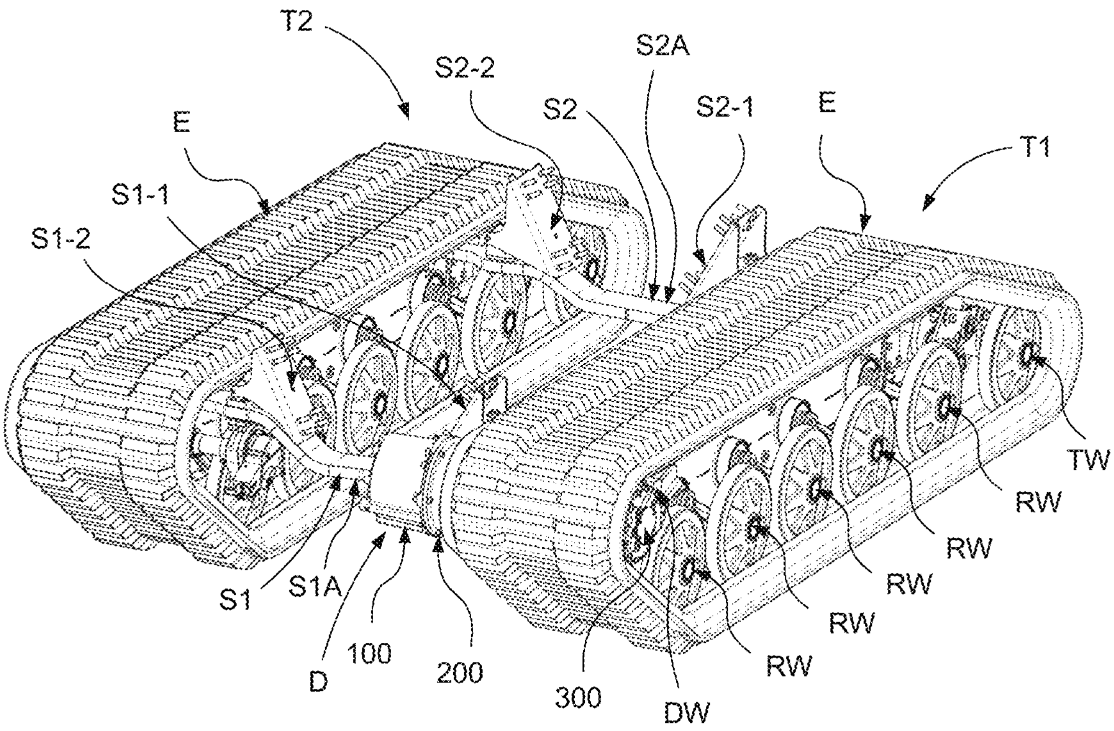
FIG. 3A schematically illustrates a perspective view of a pair of track assemblies of a tracked vehicle according to an embodiment of the present invention.
Figure 3B:
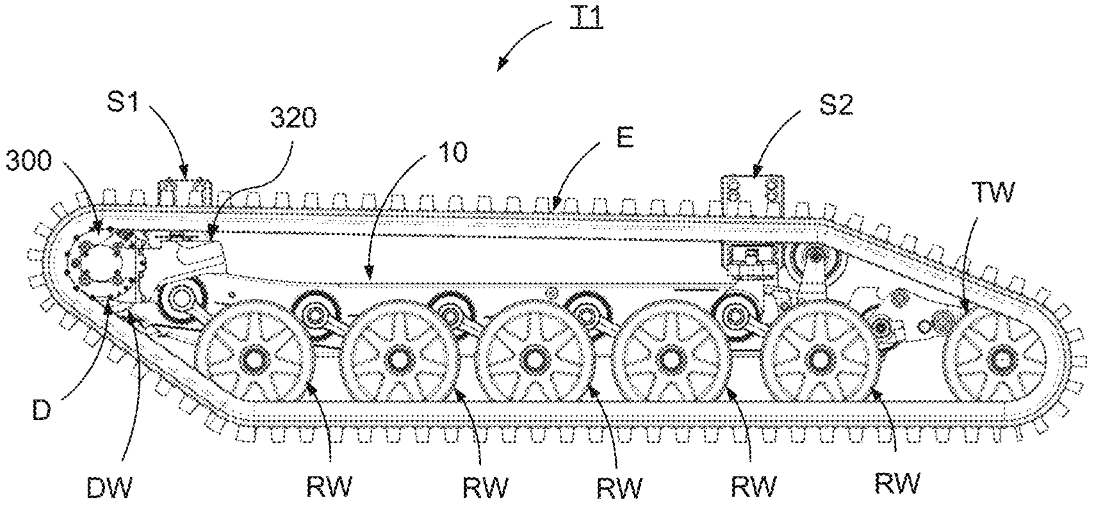
FIG. 3B schematically illustrates a side view of a track assembly in FIG. 3A.

FIG. 2 schematically illustrates a plan view of the tracked vehicle V in FIG. 1A according to an embodiment of the present disclosure. FIG. 3A schematically illustrates a perspective view of a track assembly pair T1, T2 of a tracked vehicle and FIG. 3B schematically illustrates a side view of the left track assembly T1 in FIG. 3A.

The tracked vehicle V comprises a left track assembly T1, a right track assembly T2 and a vehicle body B. The left and right track assemblies T1, T2 provides a track assembly pair T1, T2. Said tracked vehicle V is thus configured to comprises a pair of track assemblies T1, T2 configured to be arranged to suspendedly support said vehicle body B of said vehicle so as to allow relative movement between said vehicle body B and each track assembly T1, T2. The respective track assembly T1, T2 has a longitudinal extension configured to run in the longitudinal extension of the vehicle V, when assembled to the vehicle body B.

Said track assemblies T1, T2 are suspendedly arranged to said vehicle body by means of a suspension arrangement S1, S2, see e.g. FIG. 3A. The suspension arrangement according to the present disclosure may be any suitable suspension arrangement for suspendedly support said vehicle body.

The left and right track assemblies T1, T2 of said track assembly pair T1, T2 comprises a track support beam 10 configured to support a plurality of road wheels, not shown in FIG. 2, a drive wheel member DW, and a drive arrangement D for operating said drive wheel member DW. The left track assembly T1 comprises a track support beam 10 configured to support a plurality of road wheels, a drive wheel member DW, and a drive arrangement D. The right track assembly T2 comprises a track support beam 10 configured to support a plurality of road wheels, a drive wheel member DW, and a drive arrangement D. The left and right track assemblies T1, T2 of said track assembly pair T1, T2 comprises an endless track E being disposed around said road wheels and drive wheel member DW. The track support beam 10 of the respective track assembly T1, T2 has a longitudinal extension configured to run in the longitudinal extension of the vehicle V, when the track assembly is assembled to the vehicle body B.

According to an aspect of the present disclosure, e.g. as illustrated in FIG. 3A, the suspension arrangement S1, S2 has a leaf spring configuration.

According to an aspect of the present disclosure, said suspension device S1, S2 comprises a front leaf spring element S1 being transversally arranged relative to the longitudinal extension of the tracked vehicle V in the front portion of said vehicle between the left track assembly T1 and right track assembly T2. Said front leaf spring element S1 is arranged between said left and right track assemblies T1, T2 in connection to the track support beam 10 of the respective track assembly T1, T2. Said front leaf spring element S1 is connected in a first end portion to the track support beam 10 of the left track assembly T1 and connected in an opposite second end portion to the track support beam 10 of the right track assembly. The first end portion of the front leaf spring element S1 is connected to a front part of the track support beam 10 of the left track assembly T1 in connection to said drive wheel member and drive arrangement D of the left track assembly T1. The second end portion of the front leaf spring element S1 is connected to a front part of the track support beam 10 of the right track assembly T2 in connection to said drive wheel member and drive arrangement of the right track assembly T1.

According to an aspect of the present disclosure, said front leaf spring element S1 has a U-shaped configuration S1A having double bending portions/transitions with double bending portions configured to be arranged in connection to the respective side of the vehicle body, and an under portion arranged to run underneath the vehicle body, the vehicle body not being shown in FIG. 3A. The front leaf spring element S1 comprises a first attachment member S1-1 arranged in connection to a first bending portion and a second attachment member S1-2 arranged in connection to an opposite second bending portion of the U-shaped configuration S1A. Said first attachment member S1-1 and second attachment member S1-2 are configured to provide attachment for said vehicle body, not shown in FIG. 3A. The U-shaped configuration S1A is further configured to laterally project from each side of the vehicle body and being attached to the track support beam 10 of the left and right track assembly T1, T2.

According to an aspect of the present disclosure, said suspension device S1, S2 comprises a rear leaf spring element S2 being transversally arranged relative to the longitudinal extension of the tracked vehicle V in the front portion of said vehicle between the left track assembly T1 and right track assembly T2. Said rear leaf spring element S2 is arranged between said left and right track assemblies T1, T2 in connection to the track support beam 10 of the respective track assembly T1, T2. Said rear leaf spring element S2 is connected in a first end portion to the a rear part of track support beam 10 of the left track assembly T1 and connected in an opposite second end portion to a rear part of the track support beam 10 of the right track assembly.

According to an aspect of the present disclosure, said rear leaf spring element S2 has a U-shaped configuration S2A having double bending portions/transitions with double bending portions configured to be arranged in connection to the respective side of the vehicle body, and an under portion arranged to run underneath the vehicle body, the vehicle body not being shown in FIG. 3A. The rear leaf spring element S2 comprises a first attachment member S2-1 arranged in connection to a first bending portion and a second attachment member S2-2 arranged in connection to an opposite second bending portion of the U-shaped configuration S2A. Said first attachment member S2-1 and second attachment member S2-2 are configured to provide attachment for said vehicle body, not shown in FIG. 3A. The U-shaped configuration S2A is further configured to laterally project from each side of the vehicle body and being attached to the track support beam 10 of the left and right track assembly T1, T2.

According to an aspect of the present disclosure, not shown, said suspension arrangement may comprises a leaf spring arrangement having portions transversally arranged relative to the longitudinal extension of the vehicle, where said leaf spring arrangement comprises L-shaped leaf spring members, each leaf spring member having a first portion attached to the vehicle body, a second portion attached to the track support beam and a transition portion there between, so that compressive and tensile stresses are located to said transition portion.

Said drive wheel member DW is configured to be rotated about a centre axis Z. The drive arrangement D of the respective track assembly T1, T2 is configured to be coaxially arranged relative to said centre axis Z of said drive wheel member DW. The drive arrangement D of the respective track assembly T1, T2 has a main direction of extension essentially orthogonal to the longitudinal direction of said endless track and essentially parallel to the transversal direction of said endless track E.

The drive arrangement D of the respective track assembly T1, T2 comprises a motor device 100 for driving said drive wheel member DW, a transmission device 200 for transferring torque from said motor device 100 to said drive wheel member DW and a brake arrangement 300 for braking the drive wheel member DW. Said motor device 100 may comprise an electric motor or a hydraulic motor. Said motor device 100 is described in more As schematically illustrated in FIG. 2, the drive arrangement D of the respective track assembly T1, T2 may be operably connected to a power supply arrangement 400 for providing power for operating the drive arrangement D the respective track assembly T1, T2. The power supply arrangement 400 may be any suitable power supply arrangement for supplying power to drive arrangement D, i.e. supplying power to motor device 100 of said drive arrangement D.

According to an aspect of the present disclosure, said power supply arrangement 400 may comprise an internal combustion engine. According to an aspect of the present disclosure, the internal combustion engine may be constituted by a diesel engine.

According to an alternative aspect of the present disclosure, said power supply arrangement 400 may comprise an energy supply arrangement such as a battery supply arrangement and/or a fuel cell arrangement, e.g. hydrogen fuel cells.

According to an aspect of the present disclosure, said power supply arrangement 400 may comprise one or more generator units for generating high voltage. One or more control devices, e.g. electronic control units, are provided for controlling, e.g. for each drive arrangement D, said one or more control devices comprising one or more control devices configured to receive high voltage from generator units and transfer said high voltage to drive voltage, i.e. alternating voltage, for said motor device 100 of said drive arrangement D. Said power supply arrangement 400 is according to an aspect of the present disclosure configured to provide a D.C. bus configured to distribute power, i.e. voltage, to e.g. each drive arrangement D.

For a tracked vehicle in the shape of an articulated tracked vehicle having a front vehicle unit and a rear vehicle unit, e.g. as illustrated in FIG. 1B, such a power supply 400 may be arranged in the front vehicle unit or the rear vehicle unit or in both the front vehicle unit and the rear vehicle unit.

Figure 4A:
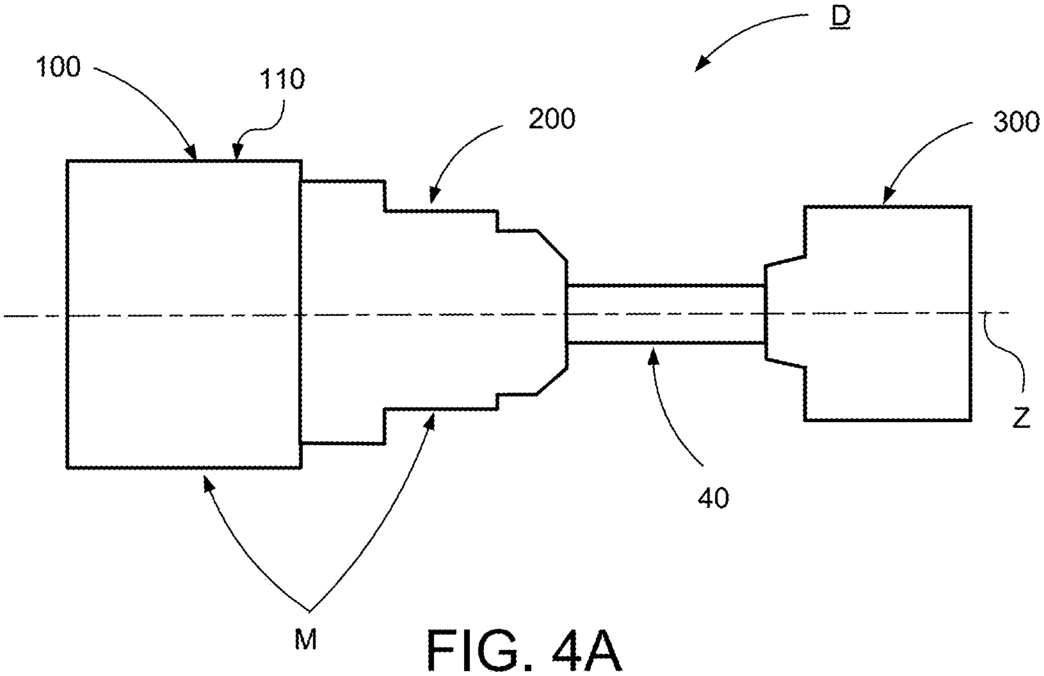
FIG. 4A schematically illustrates a side view of a drive arrangement for a track assembly according to an embodiment of the present disclosure.
Figure 4B:
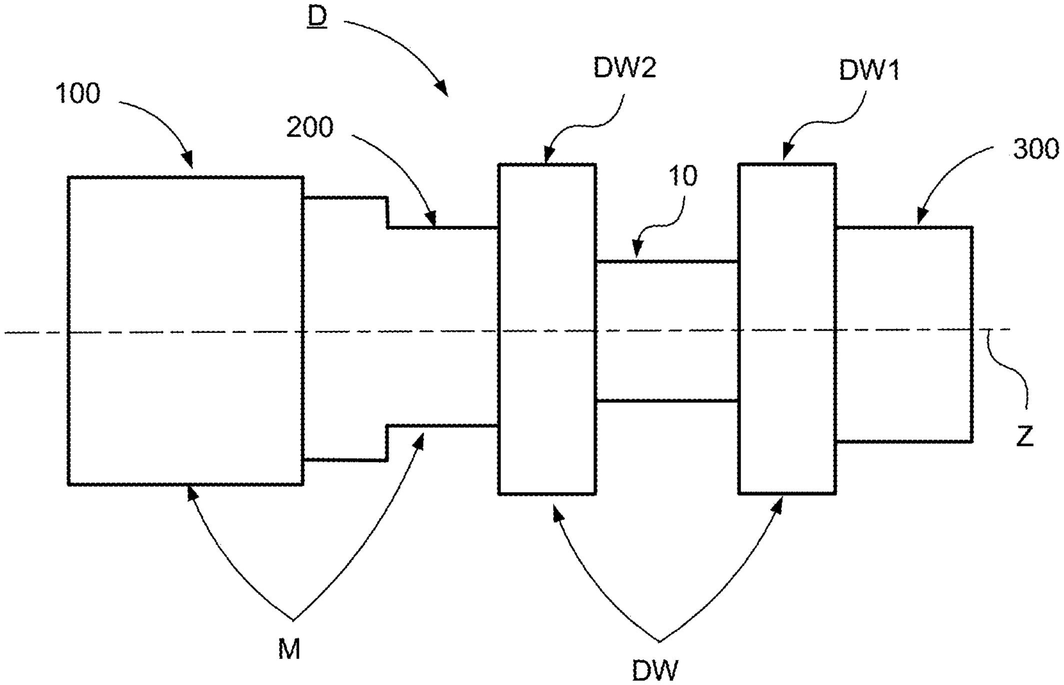
FIG. 4B schematically illustrates a side view of the drive arrangement in FIG. 4A connected to a track support beam of a track assembly and being provided with drive wheel member, according to an embodiment of the present disclosure.

FIG. 4A schematically illustrates a side view of said drive arrangement D and FIG. 4B schematically illustrates a side view of said drive arrangement D supported by said track support beam 10 according to an aspect of the present disclosure.

In FIG. 4B, said drive arrangement D is journaled in bearings to said track support beam 10. In FIG. 4B, said drive arrangement D is operably supporting said drive wheel member DW.

Figure 5:
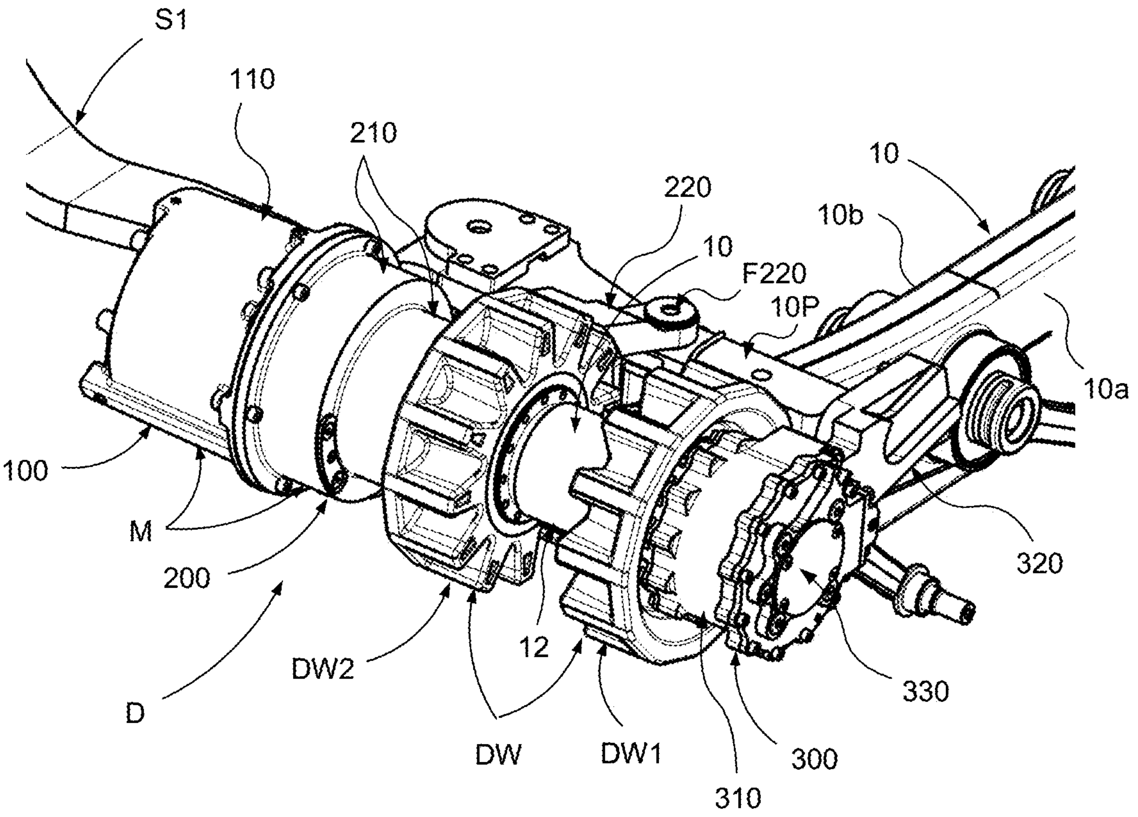
FIG. 5 schematically illustrates a perspective view of a drive arrangement connected to a track support beam of a track assembly and being provided with drive wheel member, according to an embodiment of the present disclosure.

FIG. 5 schematically illustrates a perspective view of said drive arrangement D journaled in bearings to said track support beam 10, operably supporting said drive wheel member DW.

Said drive arrangement D is thus configured to be journaled in bearings in said track support beam 10 for allowing rotation of said drive wheel member DW relative to said track support beam 10 and for supporting said drive arrangement D.

As illustrated in FIG. 2 and FIG. 5, said track support beam 10 has an outer side 10*a* configured to face away from the vehicle body B and an opposite inner side 10*b* configured to face towards said vehicle body when the track assembly is connected to said vehicle body B. Herein, when referring to said track support beam 10 having an outer side 10*a* configured to face away from the vehicle body B and an opposite inner side 10*b* configured to face towards said vehicle body when the track assembly is connected to said vehicle body B, it refers to a portion of the vehicle body B, e.g. vehicle chassis, arranged between the right and left track assembly and hence right and left drive wheel member. Thus, said track support beam 10 has an outer side 10*a* facing in a transversal direction of the vehicle V, and transversal direction relative to its longitudinal extension, outwardly away from the opposite track assembly and, and an opposite inner side 10*b* facing in a transversal direction of the vehicle V, and transversal direction relative to its longitudinal extension, inwardly towards the opposite track assembly.

As schematically illustrated in FIG. 2, the outer side 10*a* of the track support beam 10 of the left track assembly T1 of the tracked vehicle V is configured to face away from the right track assembly T2 of the tracked vehicle V. As schematically illustrated in FIG. 2, the outer side 10*a* of the track support beam 10 of the right track assembly T2 of the tracked vehicle V is configured to face away from the left track assembly T1 of the tracked vehicle V.

As schematically illustrated in FIG. 2, the inner side 10*b* of the track support beam 10 of the left track assembly T1 of the tracked vehicle V is configured to face the right track assembly T2 of the tracked vehicle V. As schematically illustrated in FIG. 2, the inner side 10*b* of the track support beam 10 of the right track assembly T2 of the tracked vehicle V is configured to face the left track assembly T1 of the tracked vehicle V.

Said drive wheel member DW comprises an outer drive wheel DW1 arranged in connection to the outer side of the track support beam 10 and an inner drive wheel DW2 arranged in connection to the inner side of the track support beam 10.

Figure 6:
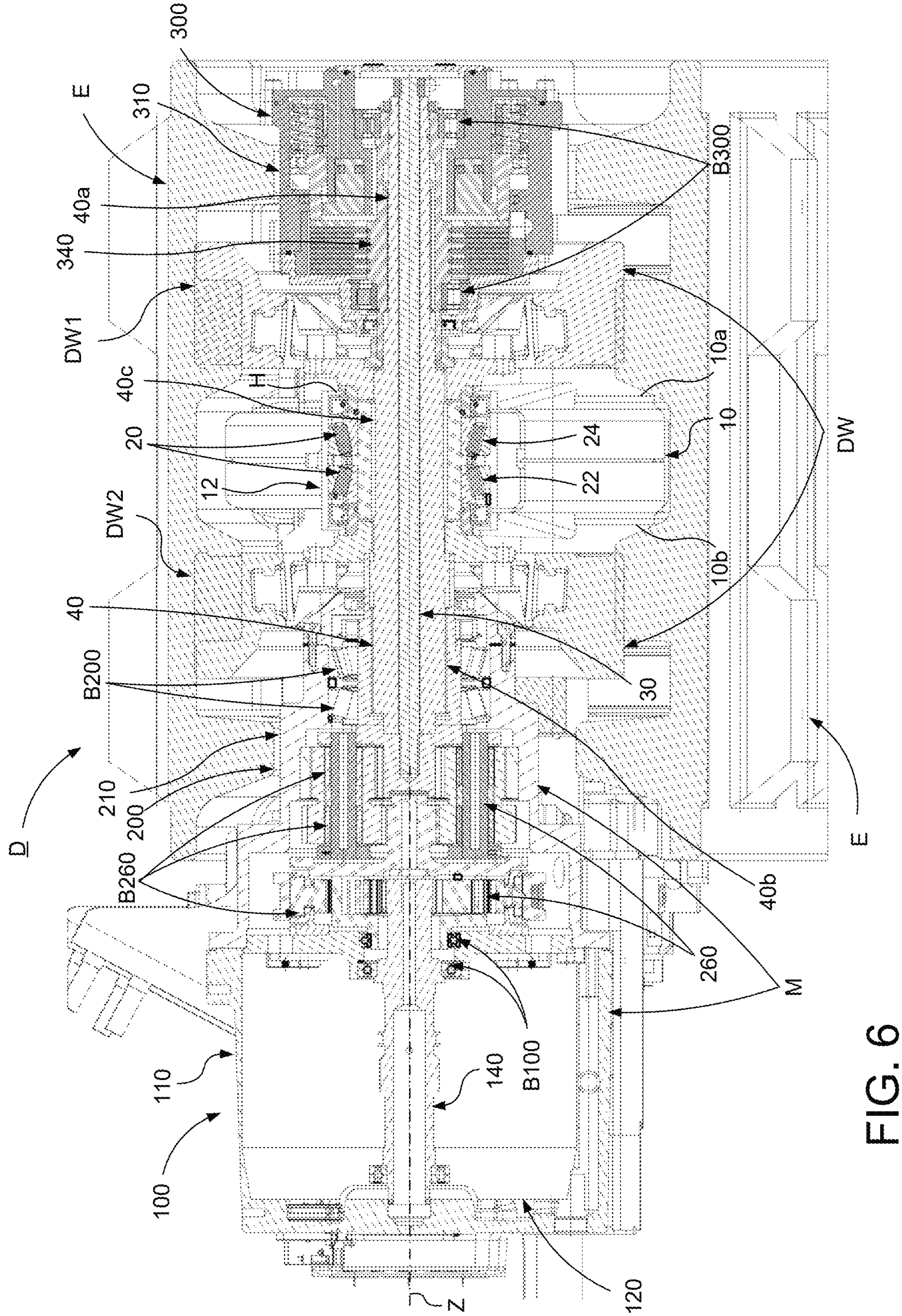
FIG. 6 schematically illustrates a cross sectional view of the drive arrangement in FIG. 5, connected to a track support beam of a track assembly and being provided with drive wheel member, according to an embodiment of the present disclosure.

FIG. 6 schematically illustrates a cross sectional view of said drive arrangement D supported by said track support beam 10 according to an aspect of the present disclosure.

The cross section is in the axial direction, i.e. the direction of the axis Z. Said drive arrangement D is journaled in bearings to said track support beam 10.

Said drive arrangement D comprises a drive axle 40 for driving said drive wheel member DW. Said drive wheel member DW is configured to be operably connected to said drive axle 40. Said drive wheel member DW is according to an aspect of the present disclosure configured to be connected to said drive axle 40 by means of a splines connection.

The track assembly for the respective drive arrangement D comprises a bearing configuration 20 arranged in said track support beam 10 for providing bearing of said drive arrangement D. According to an aspect of the present disclosure, the track support beam 10 has a front portion 12 in which said bearing configuration 20 is configured to be arranged. According to an aspect of the present disclosure, the front portion 12 of the track support beam 10 has a through hole H. The centre of said through hole H will correspond to the centre axis Z when the drive arrangement D and drive wheel member DW is connected to the track support beam 10.

The bearing configuration 20 is configured to be arranged in said through hole H of the front portion 12 of the track support beam 10. According to an aspect of the present disclosure, said bearing configuration 20 is a tapered roller bearing device.

According to an aspect of the present disclosure, said bearing configuration 20 comprises a first roller bearing 22 and an opposite second roller bearing 24. According to an aspect of the present disclosure, first roller bearing 22 and second roller bearing 24 are arranged in connection to each other within said through hole H of the front portion 12 of the track support beam 10 so as to optimize facilitating tipping torque of said drive arrangement D. According to an aspect of the present disclosure, said first roller bearing 22 and second roller bearing 24 are configured to be arranged in connection to each other within said through hole H of the front portion 12 of the track support beam 10 such that there is a certain pre-tension in said roller bearings 22, 24 of said bearing configuration 20. According to an aspect of the present disclosure, said tapered roller bearing device comprises said first roller bearing 22 and an opposite second roller bearing 24.

Said drive axle 40 of the drive arrangement D is configured to run through said through hole H of the front portion 12 of the track support beam 10 in connection to said bearing configuration 20. According to an aspect of the present disclosure, the drive axle 40 is configured to be connected to the bearing configuration 20 by means of a splines connection so that said drive axle 40 may be rotated relative to said track support beam 10.

Said drive axle 40 of the drive arrangement D is configured to run through said through hole H of the front portion 12 of the track support beam 10 so that a portion 40*a* of the drive axel 40 is protruding in the axial direction from said through hole in connection to the outer side 10*a* of said track support beam 10. According to an aspect of the present disclosure, said outer drive wheel DW1 is configured to be attached to a portion of the drive axle 40 protruding in the axial direction from the outer side of said track support beam 10.

Said drive axle 40 of the drive arrangement D is configured to run through said through hole H of the front portion 12 of the track support beam 10 so that a portion 40*b* of the drive axel 40 is protruding in the axial direction from said through hole in connection to the inner side 10*b* of said track support beam 10. According to an aspect of the present disclosure, said inner drive wheel DW2 is configured to be attached to a portion of the drive axle 40 protruding in the axial direction from the inner side of said track support beam 10.

According to an aspect of the present disclosure, said drive axle 40 is running transversely relative to the longitudinal extension of said track support beam 10 through said through hole H. According to an aspect of the present disclosure, said drive axle 40 has a transversal extension with a central portion 40*c* configured to be arranged in said through hole and connected to said bearing configuration for said journaling in bearings within the front portion 12 of said track support beam 10.

According to an aspect of the present disclosure, said drive axle 40 with said transversal extension with said central portion 40*c* has an outer extension 40*a* configured to protrude in the axial direction outwardly from said track support beam into said brake arrangement 300. Said drive axle 40 with said transversal extension with said central portion 40*c* has an inner extension 40*b* configured to protrude in the axial direction inwardly from said track support beam into said transmission device 200.

Said bearing configuration 20 is thus, according to an aspect of the present disclosure, arranged in a through hole H of said track support beam 10, centrally between said outer drive wheel DW1 and inner drive wheel DW2.

Said outer drive wheel DW1 and inner drive wheel DW2 are coaxially arranged relative to each other at a distance along the axis Z from each other, wherein said front portion 12 of said track support beam is arranged between said outer drive wheel DW1 and inner drive wheel DW2 such that said through hole H is arranged between said outer drive wheel DW1 and inner drive wheel DW2 coaxially with said axis Z.

According to an aspect of the present disclosure, said drive arrangement D is supported between said outer drive wheel DW1 and inner drive wheel DW2 in said through hole H of said outer portion 12 of said track support beam 10. Said drive axle 40 of said drive arrangement D is supported between said outer drive wheel DW1 and inner drive wheel DW2 in said through hole H of said outer portion 12 of said track support beam 10.

According to an aspect of the present disclosure, said drive arrangement D is supported between said outer drive wheel DW1 and inner drive wheel DW2 in said through hole H of said outer portion 12 of said track support beam 10 by means of supporting said drive axle 40 of said drive arrangement D with said bearing configuration 20. Said bearing configuration 20 is thus arranged in said through hole H of said track support beam 10, centrally between said outer drive wheel DW1 and inner drive wheel DW2.

As mentioned above, the drive arrangement D comprises a motor device 100 for driving said drive wheel member DW, a transmission device 200 for transferring torque from said motor device 100 to said drive wheel member DW and a brake arrangement 300 for braking the drive wheel member DW.

According to an aspect of the present disclosure, said brake arrangement 300 is configured to be arranged in connection to the outer side 10*a* of said track support beam 10.

According to an aspect of the present disclosure, said transmission device 200 is configured to be arranged in connection to the inner side 10*b* of said track support beam 10 and said motor device 100 is configured to be arranged internally relative to said transmission device 200 so that said transmission device 200 is arranged between the motor device 100 and brake arrangement 300.

Said motor device 100 may comprise an electric motor or a hydraulic motor. Said motor device 100 comprises a motor housing 110 for housing parts associated with said motor device 100. Said motor device 100 comprises a motor 120 for said driving. Said motor 120 is configured to be housed in said housing 110.

According to an aspect of the present disclosure, said motor comprises a stator configured to be fixedly connected to said motor housing 110 of said motor 100, and a rotor for providing a rotational movement of a motor axle 140 relative to the stator.

According to an aspect of the present disclosure, a power supply, e.g. a power supply 400 schematically illustrated in FIG. 2, may be configured to provide power for said motor device 100, i.e. for operating said rotor 120*a* of said motor 120 and hence said motor axle 140.

The motor device comprises a bearing configuration B100 arranged in said motor housing 110 of said motor device 100 for providing bearing of said motor axle 140. According to an aspect of the present disclosure, said bearing configuration B100 is a deep groove ball bearing device. According to an aspect of the present disclosure, the motor axle 140 is configured to be connected to the bearing configuration B100 by means of a splines connection so that said motor axle 140 may be rotated relative to said motor housing 110.

According to an aspect of the present disclosure, said motor axle 140 is configured to be operably connected to said transmission device 200 for transferring torque from said motor axle 140 to said drive axle 40.

According to an aspect of the present disclosure, said transmission device 200 comprises a transmission housing 210 for housing parts associated with said transmission device 200.

Said transmission device 200 of said drive arrangement D comprises a torque arm 220, see e.g. FIG. 5. Said torque arm 220 is configured to provide torque resistance in connection to rotation of said drive axle 40. Said torque arm 220 is configured to be connected to said track support beam 10 so as to essentially prevent rotation of said transmission device 200 about said centre axis Z.

According to an aspect of the present disclosure, said transmission device 200 comprises a gear arrangement 260. Said gear arrangement 260 may be any suitable gear arrangement for transferring torque from the motor device 100 to said drive wheel member DW for driving a track assembly and hence driving the tracked vehicle having said track assembly.

According to an aspect of the present disclosure, said gear arrangement 260 may comprise a planetary gear configuration. The transmission device 200 comprises a bearing configuration B260 arranged for providing bearing of said gear arrangement 260. According to an aspect of the present disclosure, said bearing configuration B260 is a needle roller bearing device.

Said transmission device 200 is configured to transfer said torque from said motor device 100 to said drive wheel member DW via said drive axle 40 by means of said gear arrangement 260.

According to an aspect of the present disclosure, said drive axle 40 is configured to run from said transmission device through the inner drive wheel DW2, through the through hole H of said track support beam 10 in connection to said bearing configuration 20, through said outer drive wheel DW1 and further through a major portion of said brake arrangement 300.

According to an aspect of the present disclosure, said motor device 100 and transmission device 200 are comprised in a drive unit M. Said drive arrangement D thus comprises a drive unit M comprising said motor device 100 and transmission device 200. Said motor device 100 and transmission device 200 of the drive arrangement D thus provides a drive unit M. The drive unit M comprises a housing configuration 110, 210. Said housing configuration 110, 210 comprises said motor housing 110 and said transmission housing 210.

According to an aspect of the present disclosure, said drive unit M is configured to be pivotably journaled in bearings in connection to a portion of the drive axle 40 configured to protrude in the axial direction from the inner side 10*b* of said track support beam 10 so as to allow rotation of the drive axle 40 relative to said housing configuration 110, 210 of said drive unit M. The bearing configuration B200 is configured to be arranged around said portion of said drive axle 40 configured to protrude in the axial direction from the inner side 10*b* of said track support beam 10.

According to an aspect of the present disclosure, the drive arrangement D comprises a bearing configuration B200 arranged in said housing configuration of said drive unit M, here in connection to the transmission housing 210, for providing bearing of said drive unit M. According to an aspect of the present disclosure, said bearing configuration B200 is a tapered roller bearing device.

According to an aspect of the present disclosure, the drive axle 40 is configured to be connected to the bearing configuration B200 by means of a splines connection so that said drive axle 40 may be rotated relative to said housing configuration, i.e. said transmission housing 210.

According to an aspect of the present disclosure, the drive arrangement D comprises a centre support bar 30 coaxially arranged within said drive arrangement D. Said centre support bar 30 is configured to run in the axial direction, i.e. in the direction of said axis Z. Said centre support bar 30 is configured to run transversely relative to the longitudinal extension of said track support beam 10.

Said centre support bar 30 is configured to supportingly connect said transmission device 200 and brake arrangement 300. Said centre support bar 30 is configured to supportingly connect said drive unit M and brake arrangement 300.

Said centre support bar 30 is configured to coaxially coincide with the centre axis Z of said drive wheel member DW.

Said centre support bar 30 is configured to run through said drive axle 40 so as to provide said connection of said transmission device 200 and brake arrangement 300. Said centre support bar 30 is configured to run through said drive axle 40 so as to provide said connection of said drive unit M and brake arrangement 300.

Said drive axle 40 thus has a tube configuration. Said drive axle 40 thus has the shape of a tube, providing a through hole for said centre support bar 30. Said drive axle 40 thus has a tube configuration, configured to receive said centre support bar 30. Said drive axle 40 has a hollow configuration for allowing introduction of said centre support bar 30 into said drive axle 40.

Figure 7:
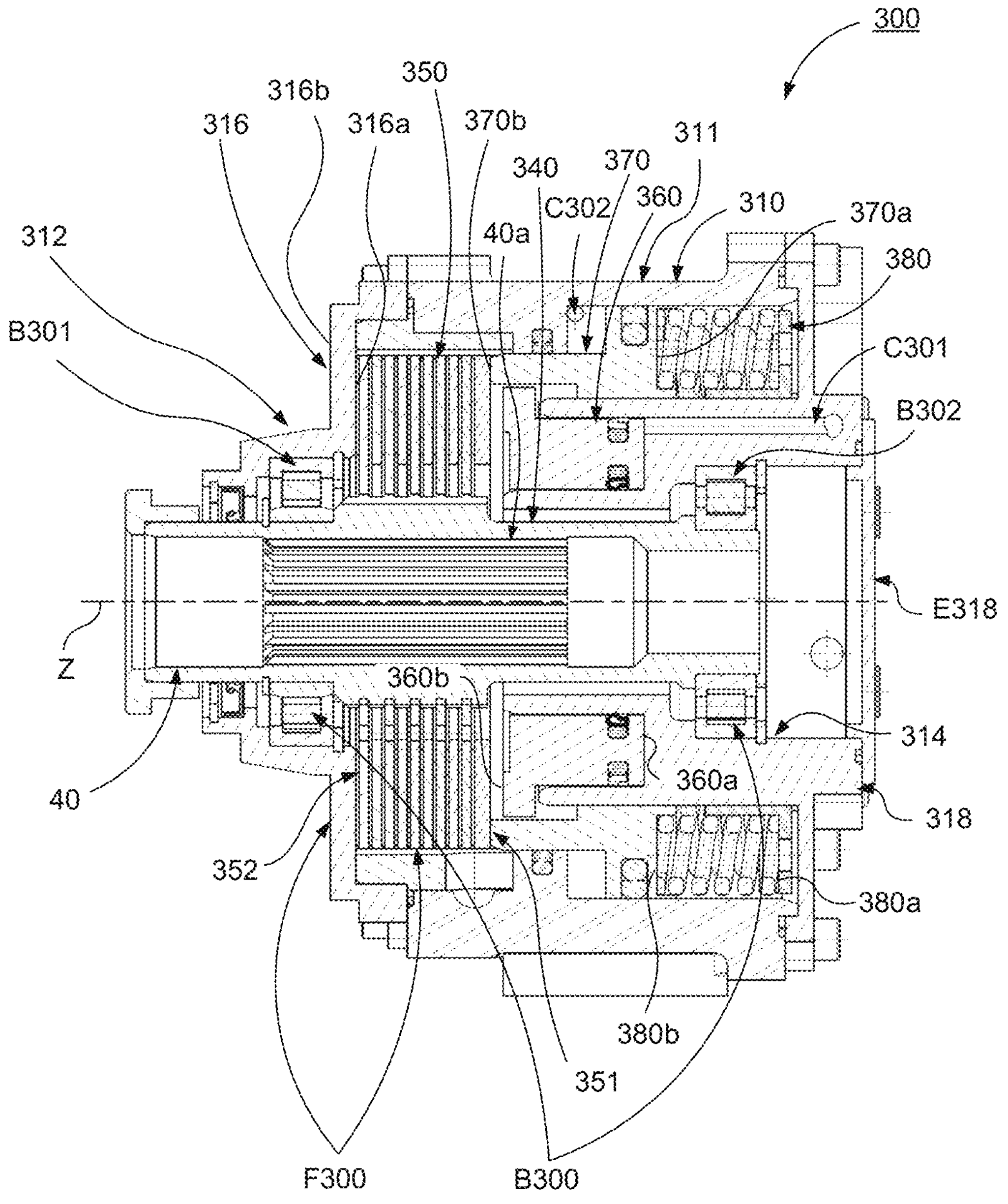
FIG. 7 schematically illustrates a cross sectional view of a brake arrangement of the drive arrangement in FIG. 6, according to an embodiment of the present disclosure.

FIG. 7 schematically illustrates a cross sectional view of a brake arrangement 300 according to an aspect of the present disclosure. The brake arrangement is according to an aspect of the present disclosure configured to be comprised in a drive arrangement D according to the present disclosure, which in turn is configured to be comprised in a track assembly of a tracked vehicle.

Said brake arrangement 300 comprises a brake housing 310 for brake parts associated with said brake device 300. The brake arrangement 300 comprises said brake housing 310 configured to provide an enclosure for brake units of said brake arrangement 300. Said brake arrangement 300 is configured to be journaled in bearings in connection to a drive member driven drive axle 40 so as to allow rotation of said drive axle 40 relative to said brake housing 310. Said brake housing 310 is configured to be journaled in bearings in connection to a drive member driven drive axle 40 so as to allow rotation of said drive axle 40 relative to said brake housing 310. Said drive axle 40 is configured to rotate a drive wheel member DW for a track assembly of a tracked vehicle.

As mentioned above, according to an aspect of the present disclosure, said drive axle 40 is configured to be journaled in bearings in said track support beam 10 so as to allow rotation of said drive wheel member DW relative to said track support beam 10, wherein said drive axle 40 is configured to run through said track support beam 10, protruding in the axial direction from an outer side 10*a* of said track support beam 10 configured to face away from the vehicle body B when the track assembly is connected to said vehicle body B. According to an aspect of the present disclosure, said brake arrangement 300 is configured to be journaled in bearings in connection to a portion of the drive axle 40 protruding in the axial direction from the outer side 10*a* of said track support beam 10 in connection to said drive wheel member DW.

According to an aspect of the present disclosure, said brake housing 310 has a ring shaped configuration. According to an aspect of the present disclosure, said brake housing 310 has an outer wall portion 311 configured to surround said drive axle 40, when said brake arrangement is arranged in connection to said drive axle 40. According to an aspect of the present disclosure, said outer wall portion 311 is configured to be essentially coaxially arranged relative to said centre axis Z. According to an aspect of the present disclosure, said outer wall portion 311 is configured to be essentially coaxially arranged relative to said drive axle 40, when said brake arrangement is arranged in connection to said drive axle 40.

According to an aspect of the present disclosure, said brake housing 310 has a first support portion 312. According to an aspect of the present disclosure, said first support portion 312 is configured to be associated with said journaling in bearings of said brake housing 310. According to an aspect of the present disclosure, said first support portion 312 is configured to be arranged in connection to said drive wheel member DW when said brake arrangement 300 is comprised in said drive arrangement D, being suspendedly arranged in connection to said track support beam 10 of a track assembly.

According to an aspect of the present disclosure, said first support portion 312 is configured to face the track support beam 10, when said brake arrangement 300 is comprised in said drive arrangement D. According to an aspect of the present disclosure, said first support portion 312 is configured to face the outer side 10*a* of said track support beam 10, when said brake arrangement 300 is comprised in said drive arrangement D.

According to an aspect of the present disclosure, said first support portion 312 is configured to be arranged in connection to said first drive wheel DW1 of said drive wheel member DW of said track assembly. According to an aspect of the present disclosure, said first support portion 312 is configured to be arranged about said drive axle 40. According to an aspect of the present disclosure, said first support portion 312 has a ring shaped configuration.

According to an aspect of the present disclosure, said brake housing 310 has a second support portion 314. According to an aspect of the present disclosure, said second support portion 314 is configured to be associated with said journaling in bearings of said brake housing 310.

According to an aspect of the present disclosure, said second support portion 314 is configured to be arranged axially opposite to said first support portion 312, and thus away from said drive wheel member DW when said brake arrangement 300 is comprised in said drive arrangement D, being suspendedly arranged in connection to said track support beam 10 of a track assembly.

According to an aspect of the present disclosure, said second support portion 314 is configured to face away from said track support beam 10, when said brake arrangement 300 is comprised in said drive arrangement D. According to an aspect of the present disclosure, said second support portion 314 is configured to be arranged in connection to an outer side of said brake housing 310, facing away from said drive wheel member DW and track support beam 10, when said brake arrangement 300 is comprised in said drive arrangement D, and thus being journaled in bearings in said track support beam.

According to an aspect of the present disclosure, said second support portion 314 is configured to be arranged about said drive axle 40. According to an aspect of the present disclosure, said second support portion 314 has a ring shaped configuration.

According to an aspect of the present disclosure, said brake housing 310 has a first end portion 316 configured to face said track support beam 10 when said brake arrangement 300 is comprised in said drive arrangement D.

According to an aspect of the present disclosure, said first end portion 316 is configured to face the outer side 10*a* of said track support beam 10, when said brake arrangement 300 is comprised in said drive arrangement D.

According to an aspect of the present disclosure, said first end portion 316 is arranged in connection to said first support portion 312. According to an aspect of the present disclosure, said first end portion 316 has a wall shape configured to extend in a plane essentially perpendicular to the extension of said centre axis Z.

According to an aspect of the present disclosure, said first end portion 316 has a wall shape configured to surround said drive axle 40. According to an aspect of the present disclosure, said first end portion 316 may be denoted first end wall portion 316. According to an aspect of the present disclosure, said first end portion 316 is configured to be connected to or transfer into said outer wall portion 311 in connection to a radially outer end of said first end portion 316.

According to an aspect of the present disclosure, said brake housing 310 has a second end portion 318 configured to face away from said track support beam 10 when said brake arrangement 300 is comprised in said drive arrangement D. Said second end portion 318 is essentially opposite to said first end portion 316. According to an aspect of the present disclosure, said second end portion 316 is configured to face away from the outer side 10*a* of said track support beam 10, when said brake arrangement 300 is comprised in said drive arrangement D. According to an aspect of the present disclosure, said second end portion 318 is arranged in connection to said second support portion 314. According to an aspect of the present disclosure, said second end portion 318 has a wall shape configured to extend in a plane essentially perpendicular to the extension of said centre axis Z. According to an aspect of the present disclosure, said second end portion 318 is configured to be connected to or transfer into said outer wall portion 311 in connection to a radially outer end of said second end portion 318.

Said brake arrangement 300 further comprises a hollow brake axle 340. Said hollow brake axle 340 is coaxially arranged relative to said centre axis Z. Said hollow brake axle 340 is configured to be arranged around said drive axle 40 so that the brake axle 340 is rotated by means of said drive axle 40. Said hollow brake axle 340 is according to an aspect of the present disclosure configured to be connected to said drive axle 40 by means of a splines connection around said drive axle so that the brake axle 340 is rotated by rotation of said drive axle 40.

According to an aspect of the present disclosure, said outer wall portion 311 is configured to surround said brake axle 40. According to an aspect of the present disclosure, said outer wall portion 311 is configured to be essentially coaxially arranged relative to said brake axle 340. According to an aspect of the present disclosure, said first end portion 316 has a wall shape configured to surround said brake axle 340 and extending in a plane essentially perpendicular to the axial extension of said brake axle 340.

According to an aspect of the present disclosure, said brake housing 310 is configured to be journaled in bearings to said brake axle 340 such that said journaling in bearings in connection to said drive axle 40 is provided when said brake arrangement 300 is connected to said drive axle 40.

According to an aspect of the present disclosure, said brake arrangement 300 is configured to be journaled in bearings in connection to an outer portion **40*a* of the drive axle 40 protruding in the axial direction from the outer side 10*a* of said track support beam 10 when said brake arrangement 300 is connected to said drive axle 40** and hence drive arrangement D of a track assembly.

According to an aspect of the present disclosure, said brake housing 310 is configured to be journaled in bearings to said brake axle 340 such that said journaling in bearings in connection to said outer portion **40*a* of the drive axle 40 is provided when said brake arrangement 300 is connected to said drive axle 40**.

According to an aspect of the present disclosure, said first support portion 312 is configured to be arranged about said brake axle 340. According to an aspect of the present disclosure, said second support portion 314 is configured to be arranged about said brake axle 340.

Said brake device 300 comprises a bearing configuration B300 for providing said journaling in bearings of said brake housing 310 in connection to said brake axle 340. Said bearing configuration B300 is arranged in said brake housing 310 of said brake arrangement 300.

Said bearing configuration B300 comprises a first bearing member B301 and a second bearing member B302 arranged at an axial distance from said first bearing member B301. One of said first bearing member B301 and second bearing member B302 is provided with a flange configuration for holding the brake housing 310 in the axial direction and the other of said first bearing member B301 and second bearing member B302 is configured to allow certain axial movement of said housing 310 relative to said brake axle 340.

In the exemplary embodiment schematically illustrated in FIG. 7, the first bearing member B301 is configured to allow certain axial movement of said housing 310 relative to said brake axle 340. In the exemplary embodiment schematically illustrated in FIG. 8, the second bearing member B302 is provided with a flange configuration for holding the brake housing 310 in the axial direction.

According to an aspect of the present disclosure, said first bearing member B301 is arranged in connection to said first support portion 312 of said brake housing 310. According to an aspect of the present disclosure, said first bearing member B301 is arranged around said brake axle 340, between said brake axle 340 and said first support portion 312, and in connection to said brake axle 340 and said first support portions 312 so as to allow rotation of said brake axle 340 relative to said first support portion 312 and hence relative to said brake housing 310. According to an aspect of the present disclosure said first bearing member B301 is a cylindrical roller bearing member.

According to an aspect of the present disclosure, said second bearing member B302 is arranged in connection to said second support portion 314 of said brake housing 310, axially opposite to said first support portion 312. According to an aspect of the present disclosure, said second bearing member B302 is arranged around said brake axle 340, between said brake axle 340 and said second support portion 314, and in connection to said brake axle 340 and said second support portions 314 so as to allow rotation of said brake axle 340 relative to said second support portion 314 and hence relative to said brake housing 310. According to an aspect of the present disclosure said second bearing member B302 is a cylindrical roller bearing member.

Said brake arrangement 300 comprises a set of friction elements 350, illustrated in FIG. 7, arranged within said brake housing 310.

Said set of friction elements 350 are configured to be arranged about said drive axle 40. Said set of friction elements 350 are configured to be arranged about said hollow brake axle 340, being arranged about said drive axle 40. Said set of friction elements 350 configured to be arranged about said brake axle 340. Said set of friction elements 350 are configured to be pressed together in the axial direction for providing a braking function in connection to said drive axle 40. Said set of friction elements 350 are configured to be axially arranged in relation to each other.

According to an aspect of the present disclosure, said brake arrangement comprises a bearing configuration B300 for providing said journaling in bearings of said brake housing 310 in connection to said brake axle 340. According to an aspect of the present disclosure, said bearing configuration B300 comprises a first bearing member B301 and a second bearing member B302 arranged at an axial distance from said first bearing member B301.

According to an aspect of the present disclosure, said set of friction elements 350 are arranged in connection to said end wall portion 316 such that said end wall portion 316 and set of friction elements 350 provides a friction arrangement F300 for providing said braking.

According to an aspect of the present disclosure, said set of friction elements 350 comprises a first set of elements configured to be engaged to said brake housing 310 and a second set of elements configured to be attached to said brake axle 340 for allowing rotation of said second set of elements relative to said first set of elements, wherein said first set of elements and second set of elements are alternatingly arranged relative to each other.

According to an aspect of the present disclosure, said brake arrangement 300 further comprises a service brake piston device 360 arranged in connection to said set of friction elements 350. Said service brake piston device 360 is configured to act on said set of friction elements 350 based on a brake action so as to press said elements together for providing a braking function for braking rotation of said drive axle 40 so as to brake drive wheel member for stopping drive of a vehicle provided with said brake arrangement.

According to an aspect of the present disclosure, said service brake piston device 360 is ring shaped and configured to be coaxially arranged around said brake axle 340.

According to an aspect of the present disclosure, said brake arrangement 300 further comprises a parking brake piston device 370 arranged in connection to said set of friction elements 350. Said parking brake piston device 370 is configured to act on said set of friction elements 350 based on a parking brake action indicating parking of a vehicle for pressing said elements together for providing a parking brake function for preventing rotation of said drive axle 40 so as to provide a parking brake activated state, preventing movement of wheel member for keeping a vehicle provided with said brake arrangement in a parked position.

According to an aspect of the present disclosure, said parking brake piston device is ring shaped and configured to be coaxially arranged around said brake axle 340 radially externally relative to said service brake piston device 360. Said parking brake piston device 370 is configured to provide pressure in the axial direction against a radially outer portion of said set of friction elements 350 so as to optimize the parking brake torque.

According to an aspect of the present disclosure, said brake arrangement further comprises a spring device 380 arranged in connection to said parking brake piston device 370. Said spring device 380, in a non-parking brake activated state, is configured to be compressed by means of providing a hydraulic pressure on said spring device 380 so that said parking brake piston device 370 does not act on said set of friction elements 350. According to an aspect of the present disclosure, in connection to a parking brake action, said hydraulic pressure on said spring device 380 is configured to be removed such that said spring device 380 acts on said parking brake piston device 370 by means of a spring force so that said parking brake piston device 370 acts on said set of friction elements 350 so as to provide a parking brake activated state.

According to an aspect of the present disclosure, said parking brake piston device 370 is configured to receive, in connection to a non-parking brake activated state, pressurized fluid via at least one channel of said channel configuration, such that said parking brake piston device 370 acts on said spring device 380 for providing said compressed state of said spring device.

Said brake arrangement 300 comprises a torque arm 320, see e.g. FIG. 5, FIG. 8, FIGS. 9A-9B, FIGS. 10A-10B. Said torque arm 320 is configured to be connected to said track support beam 10 so as to essentially prevent rotation of said brake arrangement 300 about said centre axis Z. Said torque arm 320 is configured to be attached to or constitute a portion of said brake housing 310. Said torque arm 320 is configured to be connected to said track support beam 10 so as to essentially prevent rotation of said brake housing 310 about said centre axis Z.

According to an aspect of the present disclosure, said torque arm 320 is configured to be attached to a rear portion of said brake housing 310. According to an aspect of the present disclosure, said torque arm 320 is configured to be attached to a portion of said brake housing 310 facing in the rear direction of the tracked vehicle, when said brake arrangement is assembled to said track assembly. According to an aspect of the present disclosure, said torque arm 320 is configured to be attached to said brake housing 310 such that it projects in the rear direction along said track support beam 10, see e.g. FIG. 5 and FIGS. 9A-9B.

Figure 9A:
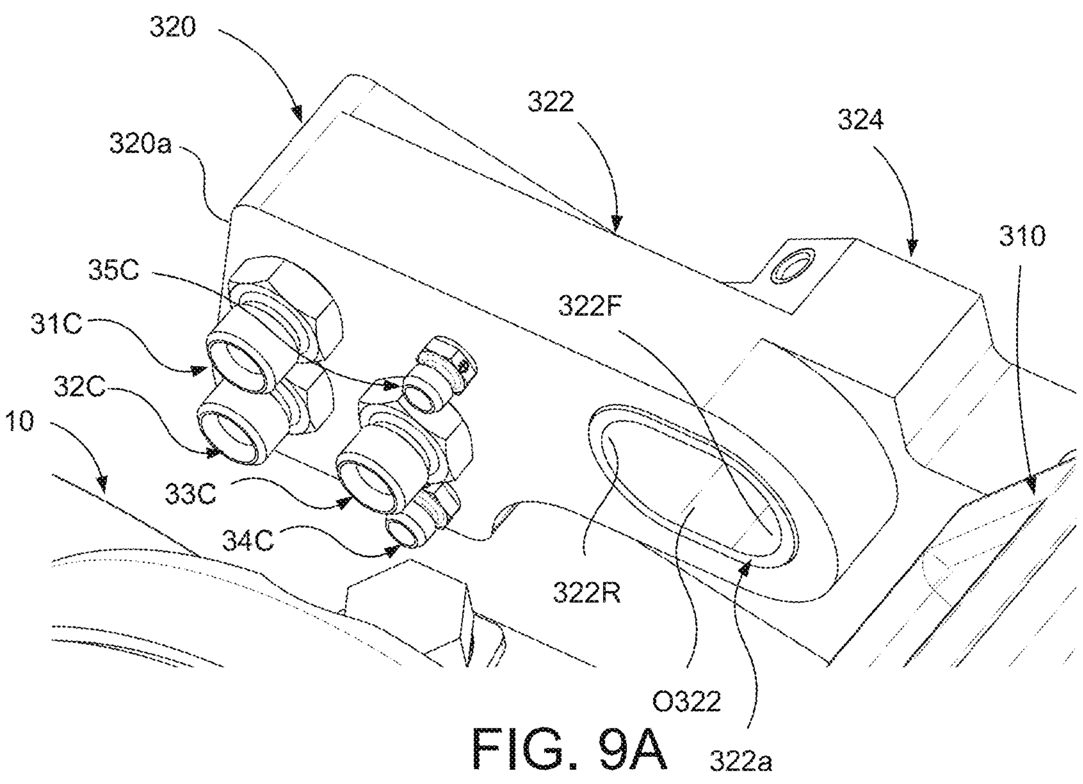
FIG. 9A schematically illustrates a perspective view of a torque arm of the brake arrangement, according to an embodiment of the present disclosure.
Figure 9B:
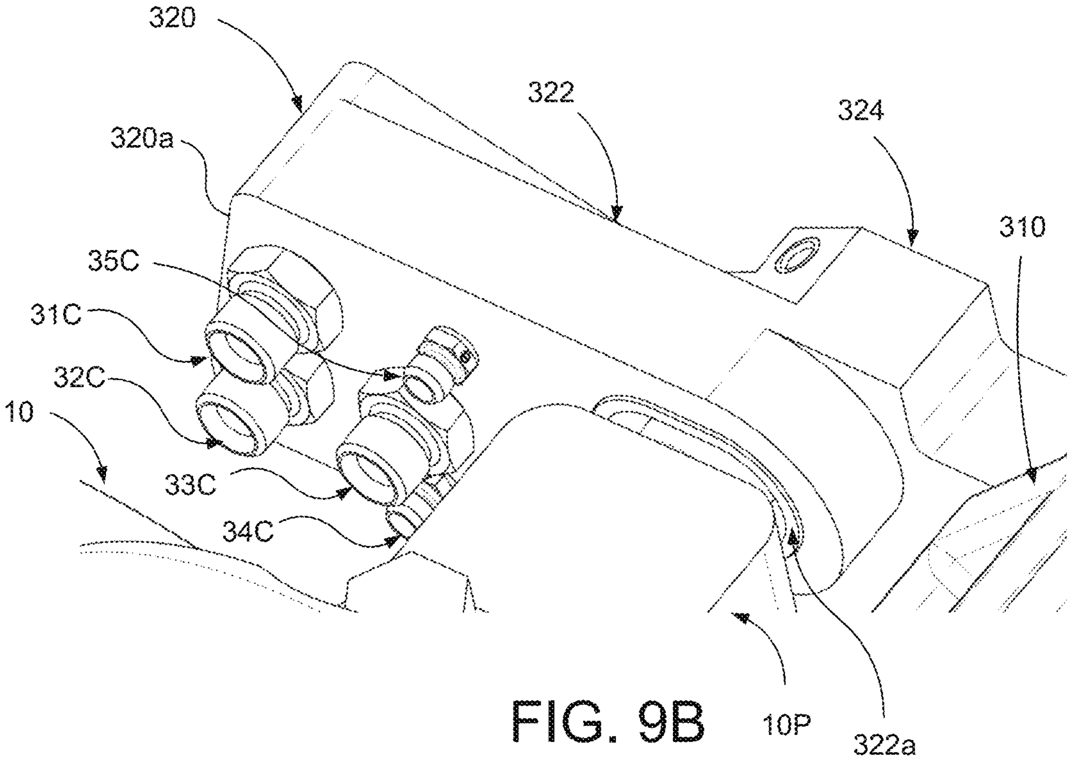
FIG. 9B schematically illustrates a perspective view of the torque arm in FIG. 9A connected to a track support beam of a track assembly, according to an embodiment of the present disclosure.
Figure 10A:
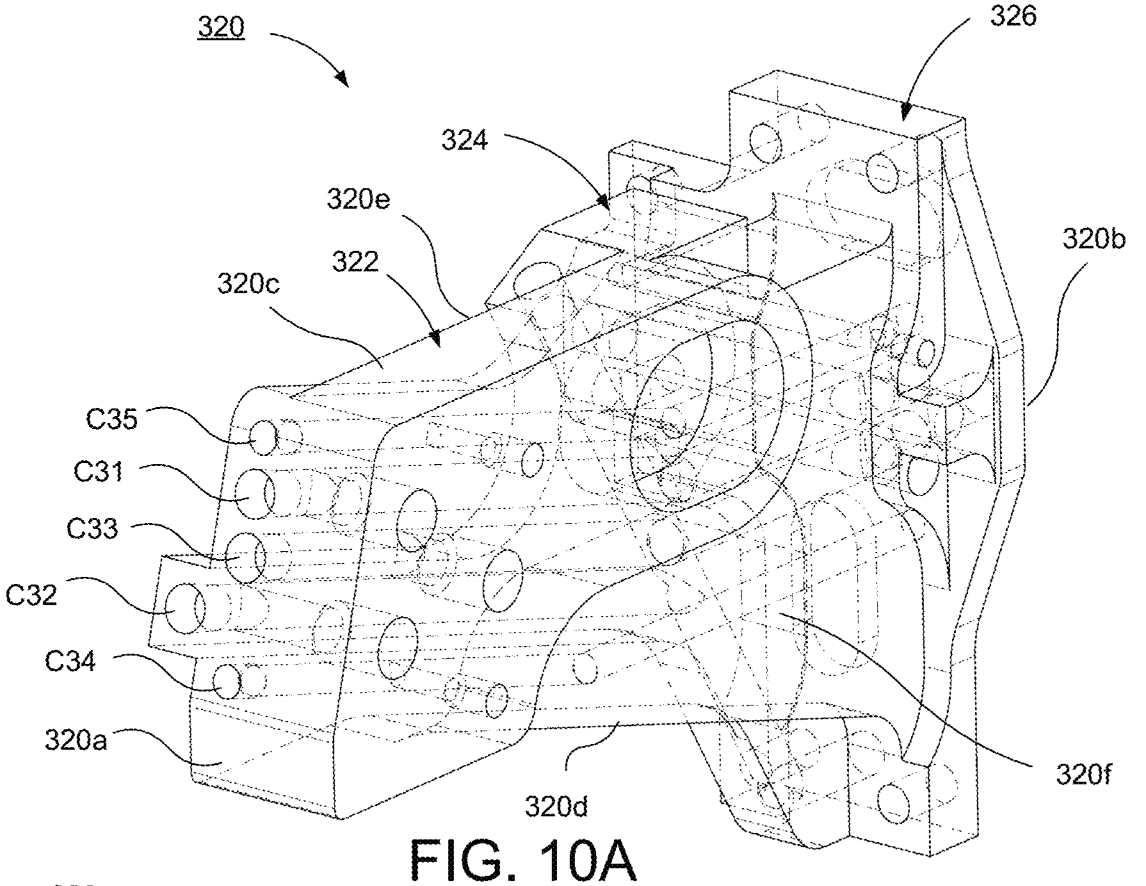
FIG. 10A schematically illustrates an inner rear perspective view of the torque arm in FIG. 9A with hidden lines, according to an embodiment of the present disclosure.
Figure 10B:
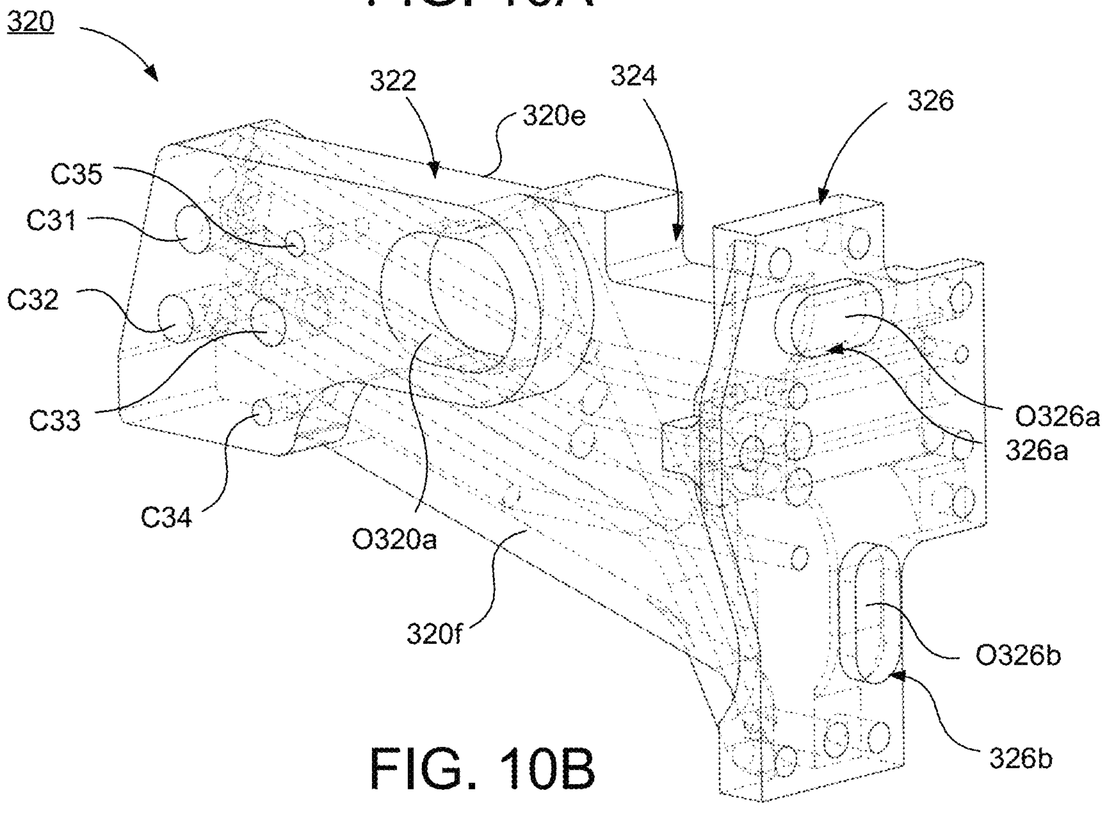
FIG. 10B schematically illustrates an inner front perspective view of the torque arm in FIG. 9A with hidden lines, according to an embodiment of the present disclosure.

According to an aspect of the present disclosure, said torque arm 320 has a rear side 320*a* configured to face away from said brake housing 310, see e.g. FIGS. 9A-9B and FIGS. 10A-10B, and an opposite front side 320*b*, see e.g. FIGS. 10A-10B, configured to face towards said brake housing and be attached to said brake housing 310.

According to an aspect of the present disclosure, said torque arm 320 has a upper side 320*c* configured to face upwardly when said brake arrangement is assembled to a track assembly of a tracked vehicle being essentially horizontally positioned on the ground and an opposite under side 320*d*, see e.g. FIGS. 10A-10B.

According to an aspect of the present disclosure, said torque arm 320 has an outer side 320*e* configured to face away from said track support beam 10 when said brake arrangement is assembled to a track assembly of a tracked vehicle and an opposite inner side 320*f* configured to face towards said track support beam 10, i.e. configured to face towards the outer side 10*a* of said support beam 10, see e.g. FIGS. 10A-10B.

According to an aspect of the present disclosure, said torque arm 320 has a rear arm portion 322 configured to be furthers away from said brake housing 310, see FIGS. 9A-9B, FIGS. 10A-10B.

According to an aspect of the present disclosure, said torque arm 320 has a front arm portion 324 configured to be closer to said brake housing 310, see FIGS. 9A-9B, FIGS. 10A-10B.

According to an aspect of the present disclosure, said torque arm 320 has a front connection portion 326 configured to provide connection to said brake housing 310, see FIGS. 9A-9B, FIGS. 10A-10B.

Said torque arm 320 is configured to provide torque resistance in connection to a brake action of said brake arrangement 300 on said drive axle 40. Said torque arm 320 is configured to be connected to said track support beam 10 so as to provide torque resistance in connection to a brake action of said brake arrangement 300 on said drive axle 40.

According to an aspect of the present disclosure, said torque arm 320 is configured to be movably connected to said track support beam 10 such that the movement of the torque arm 320 and hence brake arrangement 300 relative to said track support beam 10 is a movement in the longitudinal direction of said endless track E. According to an aspect of the present disclosure, said torque arm 320 is configured to be movably connected to said track support beam 10 such that the movement of the torque arm 320 and hence brake arrangement 300 relative to said track support beam 10 is a movement in the longitudinal direction of said track support beam 10.

According to an aspect of the present disclosure, said torque arm 320 is configured to be connected to said track support beam 10 by means of a pin member 10P between said torque arm 320 and track support beam 10.

According to an aspect of the present disclosure, said movable connection of said torque arm 320 to said track support beam 10 is arranged to be provided by means of said pin member 10P fixedly arranged in connection to said track support beam 10 and movably connected to an oval recess arranged in connection to the torque arm 320, see FIG. 9B. Alternatively said movable connection of said torque arm 320 to said track support beam 10 may be arranged to be provided by means of said pin member 10P being fixedly arranged in connection to said torque arm 320 and movably connected to said track support beam 10, e.g. to an oval recess arranged in connection to the track support beam, not shown.

According to an aspect of the present disclosure, said torque arm 320 comprises an oval recess 322*a* having an opening O322. Said oval recess is according to an aspect configured to be arranged on the rear arm portion 322 of said torque arm 320. Said oval recess is according to an aspect configured to be arranged on the inner side 320*f* of said torque arm 320, facing said outer side 10*a* of said track support beam 10. Said oval recess is according to an aspect configured to have an extension in the longitudinal direction of said track support beam 10 on said inner side 320*f* of said torque arm.

According to an aspect of the present disclosure, said pin member 10P is connected to said oval recess 322*a* such that said movement of the torque arm 320 and hence brake arrangement 300 relative to said track support beam 10 in the longitudinal direction of said endless track E is facilitated.

According to an aspect of the present disclosure, said oval recess is configured to facilitate controlled movement of the torque arm 320 relative to said track support beam 10 in the longitudinal direction of said track support beam 10. According to an aspect of the present disclosure, said oval recess is configured to facilitate guided movement of the pin member 10P and hence torque arm 320 relative to said track support beam 10 in the longitudinal direction of said track support beam 10.

According to an aspect of the present disclosure, said pin member 10P is configured to be fixedly attached in one end to said track support beam 10 and connected to said oval recess 322*a* in the opposite end such that movement of the torque arm 320 and hence brake arrangement 300 relative to said track support beam 10 in the longitudinal direction of said endless track E is facilitated and movement in the vertical direction is impeded, i.e. essentially prevented.

According to an aspect of the present disclosure, said pin member 10P is configured to be fixedly attached in one end to said track support beam 10 and connected to said oval recess 322*a* in the opposite end such that rotation of said brake housing 310 about said axis Z is essentially prevented.

According to an aspect of the present disclosure, said pin member 10P is configured to be arranged in connection to said oval recess 322*a* such that movement of the torque arm 320 and hence brake arrangement 300 relative to said track support beam 10 in the longitudinal direction of said endless track E is facilitated.

According to an aspect of the present disclosure, said pin member 10P is configured to be arranged in connection to said oval recess 322*a* such that movement of the torque arm 320 and hence brake arrangement 300 relative to said track support beam 10 in the vertical direction of said endless track E is essentially prevented.

According to an aspect of the present disclosure, said pin member 10P is configured to be arranged in connection to said oval recess 322*a* such that said pin member 10P is movable in said oval opening O322 in the longitudinal direction between a front side 322F and rear side 322R of the oval opening O322 so as to facilitate said movement of the torque arm 320 and hence brake arrangement 300 relative to said track support beam 10 in the longitudinal direction of said endless track E.

According to an aspect of the present disclosure, said pin member 10P is configured to be arranged in connection to said oval recess 322*a* such that said pin member 10P is essentially prevented to move in the vertical direction in said oval opening O322 so as to impede movement of the torque arm 320 and hence brake arrangement 300 relative to said track support beam 10 in the vertical direction of said endless track E, preventing rotation of said brake housing 310.

According to an aspect of the present disclosure, said torque arm 320 comprises an oval recess 326*a* having an opening O326*a*. Said oval recess is according to an aspect configured to be arranged on the front connection portion 326 of said torque arm 320. Said oval recess is according to an aspect configured to be arranged on the front side 320*b* of said torque arm 320, facing said brake housing 310. Said oval recess 326*a* is according to an aspect configured to have an essentially vertical extension, i.e. an extension essentially orthogonal to the longitudinal and transversal extension of said tracked vehicle when applied to said brake housing 310 being assembled to the track assembly. According to an aspect of the present disclosure, said vertical oval recess 326*a* is configured to be connected to a corresponding vertical oval protrusion of said brake housing 310 for facilitating connection of said torque arm 320 to said brake housing 310.

According to an aspect of the present disclosure, said torque arm 320 comprises an oval recess 326*b* having an opening O326*b*. Said oval recess is according to an aspect configured to be arranged on the front connection portion 326 of said torque arm 320. Said oval recess is according to an aspect configured to be arranged on the front side 320*b* of said torque arm 320, facing said brake housing 310. Said oval recess 326*b* is according to an aspect configured to have an essentially transversal extension, i.e. an extension in the transversal direction of the tracked vehicle and essentially orthogonal to the longitudinal and vertical extension of said tracked vehicle when applied to said brake housing 310 being assembled to the track assembly. According to an aspect of the present disclosure, said transversal oval recess 326*b* is configured to be connected to a corresponding transversal oval protrusion of said brake housing 310 for facilitating connection of said torque arm 320 to said brake housing 310.

According to an aspect of the present disclosure, said torque arm 320 is configured to provide transport through said torque arm 320 to parts of the brake arrangement 300 in need of fluid and/or from one or more spaces within the brake arrangement 300.

According to an aspect of the present disclosure, said torque arm 320 comprises a set of channels C31, C32, C33, C34, C35 integrated in said torque arm 320 for transportation of fluid. Said set of channels C31, C32, C33, C34, C35 comprises one or more inflow channels for fluid to be supplied to parts of the brake arrangement in need of fluid, and/or one or more outflow channels for outflow of fluid from one or more spaces within the brake arrangement 300.

According to an aspect of the present disclosure, said one or more inflow channels for fluid to be supplied to parts of the brake arrangement 300 in need of fluid comprises one or more channels for providing pressurized fluid for parts associated with brake operation of the brake arrangement and/or one or more channels for cooling and/or lubrication of parts in need of cooling and/or lubrication.

According to an aspect of the present disclosure, said torque arm 320 comprises a set of conduit connections 31C, 32C, 33C, 34C, 35C, see FIGS. 9A-9B, for connecting conduits to said set of channels C31, C32, C33, C34, C35 for said transportation of fluid.

According to an aspect of the present disclosure, said conduit connections 31C, 32C, 33C, 34C, 35C of said torque arm 320 are configured to face towards said track support beam 10.

Figure 8:
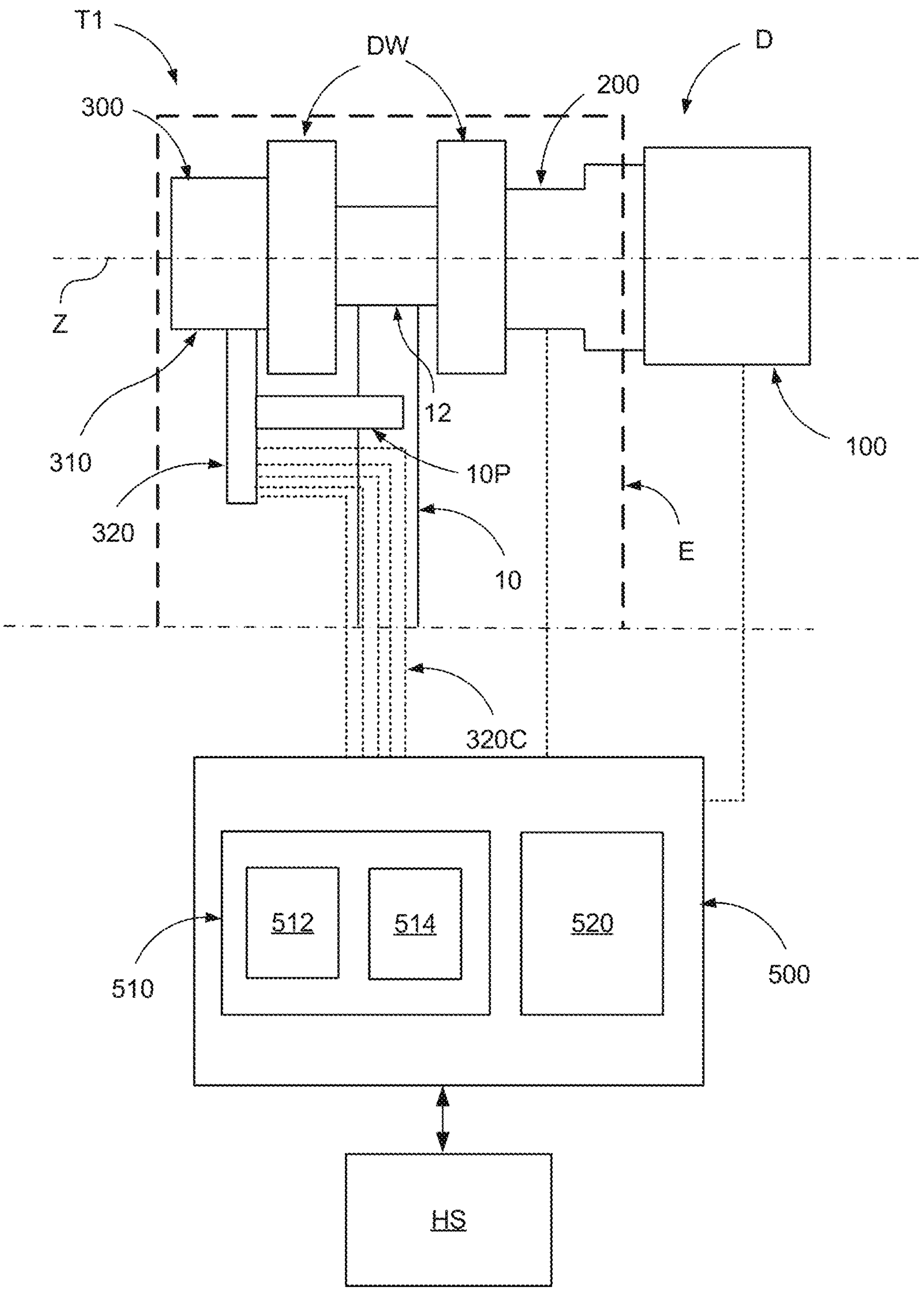
FIG. 8 schematically illustrates a plan view of a portion of a track assembly comprising a drive arrangement with a brake arrangement having a torque arm according to an embodiment of the present disclosure.

According to an aspect of the present disclosure, a fluid system 500 is provided, see FIG. 8. Said fluid system 500 is arranged for transporting fluid via said torque arm 320. According to an aspect of the present disclosure, fluid system 500 is arranged for transporting fluid to and from said brake arrangement 300 via said torque arm 320. Said fluid system 500 is configured to be comprised in said tracked vehicle V. Said tracked vehicle V comprises said fluid system 500.

According to an aspect of the present disclosure, said fluid system 500 is associated with a track assembly of the tracked vehicle. According to an aspect of the present disclosure, said fluid system 500 is configured to be operable for transporting fluid to and from a brake arrangement 300 of a track assembly via the torque arm 320 of that brake arrangement 300, when that track assembly is assembled to the vehicle body B of the tracked vehicle.

Said fluid system 500 may be a fluid system associated with a single track assembly and configured for transporting fluid to and from said brake arrangement 300 of that track assembly via said torque arm 320 of that track assembly. Said fluid system 500 may be a fluid system associated with a multiple track assemblies, e.g. a track assembly pair of the tracked vehicle, and configured for transporting fluid to and from brake arrangements 300 of the respective track assembly via the torque arm 320 of the respective track assembly.

According to an aspect of the present disclosure, fluid system 500 may be arranged for transporting fluid to and from said motor device 100. According to an alternative aspect of the present disclosure, another fluid system, not shown may be arranged for transporting fluid to and from said motor device 100.

According to an aspect of the present disclosure, fluid system 500 may be arranged for transporting fluid to and from said transmission device 200. According to an alternative aspect of the present disclosure, another fluid system, not shown may be arranged for transporting fluid to and from said transmission device 200.

According to an aspect of the present disclosure, a fluid system 500 comprises a pump arrangement 510 comprising one or more pump units 512, 514 arranged for transporting fluid, via said torque arm 320, to parts of the brake arrangement in need of fluid and/or from one or more spaces within the brake arrangement 300.

According to an aspect of the present disclosure, a fluid system 500 further comprises a fluid reservoir 520 for storage of fluid.

According to an aspect of the present disclosure, said pump arrangement 510 is arranged to transport fluid from said fluid reservoir 520, via said torque arm 320, to parts of the brake arrangement 300 in need of fluid and/or transport fluid from one or more spaces within the brake arrangement 300, via said torque arm 320, to said fluid reservoir. According to an aspect of the present disclosure one or more pump units of said pump arrangement 510 is arranged to transport fluid from said fluid reservoir 520, via said torque arm 320, to parts of the brake arrangement 300 in need of fluid and/or transport fluid from one or more spaces within the brake arrangement 300, via said torque arm 320, to said fluid reservoir.

According to an aspect of the present disclosure, said fluid system 500 comprises or is configured to be operably connected to a hydraulic system HS during operation of said tracked vehicle, when the track assembly T1 is connected to the vehicle body of the tracked vehicle. According to an aspect of the present disclosure, said hydraulic system HS is configured to provide pressurized fluid for parts associated with brake operation of the brake arrangement 300.

According to an aspect of the present disclosure, said hydraulic system HS may comprise one or more pump units for providing pressurized fluid for parts associated with brake operation of the brake arrangement 300. According to an aspect of the present disclosure one or more pump units of said pump arrangement 510 may be comprised in said hydraulic system HS for providing pressurized fluid for parts associated with brake operation of the brake arrangement 300.

According to an aspect of the present disclosure, said brake arrangement 300 further comprises a channel configuration within said brake housing 310. According to an aspect of the present disclosure, fluid is configured to be transported, via said torque arm 320, to and/or from said channel configuration within said brake housing 310. According to an aspect of the present disclosure, said channel configuration within said brake housing 310 is configured to be connected to said channel configuration of said torque arm 320 so as to allow transport of fluid to parts of the brake arrangement in need of fluid and/or from one or more spaces within the brake arrangement 300.

According to an aspect of the present disclosure, said channel configuration comprises at least one channel C301 in connection to said service brake piston device 360, see e.g. FIG. 7. According to an aspect of the present disclosure, said service brake piston device 360 is configured to receive, in connection to a braking action, pressurized fluid via said at least one channel C301 such that said service brake piston device 360 acts on said set of friction elements 350. According to an aspect of the present disclosure, said torque arm 320 is configured to provide transport through said torque arm 320 to said at least one channel C301 in connection to said service brake piston device 360.

According to an aspect of the present disclosure, said at least one channel C301 may be connected to said hydraulic system HS of the tracked vehicle, wherein said hydraulic system HS is configured to provide pressurized fluid to said at least one channel C301 for providing said pressurized fluid for said brake action.

According to an aspect of the present disclosure, said channel configuration with said at least one channel C301 in connection to said service brake piston device 360 may be comprised in said fluid system 500 for transporting fluid for said brake arrangement 300.

According to an aspect of the present disclosure, said channel configuration comprises at least one channel C302 in connection to said parking brake piston device 370, see e.g. FIG. 7. According to an aspect of the present disclosure, said parking brake piston device 370 is configured to receive, in connection to a non-parking brake activated state, pressurized fluid via said at least one channel C302 such that said parking brake piston device 370 acts on said spring device 380 for providing a compressed state of said spring device. According to an aspect of the present disclosure, said torque arm 320 is configured to provide transport through said torque arm 320 to said at least one channel C302 in connection to said parking brake piston device 370.

According to an aspect of the present disclosure, said at least one channel C302 may be connected to said hydraulic system HS of the tracked vehicle, wherein said hydraulic system HS is configured to provide pressurized fluid to said at least one channel C302 for providing said pressurized fluid for said brake action.

According to an aspect of the present disclosure, said channel configuration with said at least one channel C302 in connection to said parking brake piston device 370 may be comprised in said fluid system 500 for transporting fluid for said brake arrangement 300.

The foregoing description of the preferred embodiments of the invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated.

The invention claimed is:

1. A track assembly for a tracked vehicle, said track assembly being configured to be connected to a vehicle body of said vehicle, said track assembly comprising a track support beam configured to support a plurality of road wheels, a drive wheel member, and a drive arrangement for operating said drive wheel member, said drive wheel member being configured to be rotated about a centre axis, an endless track being disposed around said road wheels and drive wheel member, wherein said drive arrangement comprises a drive unit for driving said drive wheel member, and a brake arrangement for braking the drive wheel member, wherein said drive arrangement comprises a drive axle being configured to be coaxially arranged relative to said centre axis of said drive wheel member for rotating said drive wheel member, wherein the brake arrangement comprises a housing configured to provide an enclosure for brake members of said brake arrangement, wherein said brake arrangement is configured to be journaled in bearings in connection to a portion of the drive axle protruding from said drive wheel member so as to allow rotation of said drive axle relative to said brake housing, wherein said brake arrangement comprises a torque arm configured to be connected to said track support beam so as to prevent rotation of said brake housing of said brake arrangement about said centre axis, wherein said torque arm is attached to or constitutes a portion of said brake housing.

2. The track assembly of claim 1, wherein said drive axle is configured to be journaled in bearings in said track support beam so as to allow rotation of said drive wheel member relative to said track support beam, wherein said drive axle is configured to run through said track support beam, protruding from an outer side of said track support beam configured to face away from the vehicle body when the track assembly is connected to said vehicle body, wherein said brake arrangement is configured to be journaled in bearings in connection to a portion of the drive axle protruding from the outer side of said track support beam in connection to said drive wheel member.

3. The track assembly of claim 1, wherein said torque arm is configured to provide transport through said torque arm to parts of the brake arrangement in need of fluid and/or from one or more spaces within the brake arrangement.

4. The track assembly of claim 3, wherein said torque arm comprises a set of channels integrated in said torque arm for said transportation of fluid through said torque arm, wherein said set of channels comprises one or more inflow channels for fluid to be supplied to parts of the brake arrangement in need of fluid, and/or one or more outflow channels for outflow of fluid from one or more spaces within the brake arrangement.

5. The track assembly of claim 4, wherein said set of channels comprises one or more inflow channels, wherein said one or more inflow channels for fluid to be supplied to parts of the brake arrangement in need of fluid comprises one or more channels for providing pressurized fluid for parts associated with brake operation of the brake arrangement and/or one or more channels for cooling and/or lubrication of parts in need of cooling and/or lubrication.

6. The track assembly of claim 4, wherein said torque arm comprises a set of conduit connections for connecting conduits to said set of channels for said transportation of fluid.

7. The track assembly of claim 6, wherein said conduit connections of said torque arm are configured to face towards said track support beam.

8. The track assembly of claim 3, wherein a fluid system is provided, said fluid system being arranged for said transporting of fluid via said torque arm.

9. The track assembly of claim 8, wherein said fluid system comprises a pump arrangement comprising one or more pump units arranged for transporting fluid, via said torque arm, to parts of the brake arrangement in need of fluid and/or from one or more spaces within the brake arrangement.

10. The track assembly of claim 9, wherein said fluid system further comprises a fluid reservoir for storage of fluid, wherein said pump arrangement is arranged to transport fluid from said fluid reservoir, via said torque arm, to parts of the brake arrangement in need of fluid and/or transport fluid from one or more spaces within the brake arrangement, via said torque arm, to said fluid reservoir.

11. The track assembly of claim 8, wherein said fluid system comprises or is configured to be operably connected to a hydraulic system during operation of said tracked vehicle, when the track assembly is connected to the vehicle body of the tracked vehicle, wherein said hydraulic system is configured to provide pressurized fluid for parts associated with brake operation of the brake arrangement.

12. The track assembly of claim 1, wherein said torque arm is configured to provide torque resistance in connection to a brake action of said brake arrangement on said drive axle.

13. The track assembly of claim 1, wherein said torque arm is configured to be movably connected to said track support beam such that the movement of the torque arm and hence brake arrangement relative to said track support beam is a movement in the longitudinal direction of said endless track.

14. The track assembly of claim 13, wherein said movable connection of said torque arm to said track support beam is arranged to be provided by means of a pin member fixedly arranged in connection to one of said track support beam and torque arm and an oval recess arranged in connection to the other of said of said track support beam and torque arm, wherein said pin member is connected to said oval recess such that said movement of the torque arm and hence brake arrangement relative to said track support beam in the longitudinal direction of said endless track is facilitated.

15. The track assembly of claim 1, wherein said drive arrangement is configured to be coaxially arranged relative to said centre axis of said drive wheel member.

16. A tracked vehicle comprising at least one track assembly of claim 1.

17. A tracked vehicle of claim 16, wherein said tracked vehicle comprises a left track assembly, a right track assembly and a vehicle body, wherein said track assemblies are suspendedly arranged to said vehicle body by means of a suspension arrangement.

* * * * *